(12) United States Patent
Thangchotika

(10) Patent No.: US 12,517,171 B2
(45) Date of Patent: Jan. 6, 2026

(54) APPARATUS AND METHOD FOR COUPLING TO AN ELECTRICAL INTERFACE OF A CIRCUIT BOARD

(71) Applicant: Western Digital Technologies, Inc., San Jose, CA (US)

(72) Inventor: Channarong Thangchotika, Samut Sakhon (TH)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 189 days.

(21) Appl. No.: 18/228,054

(22) Filed: Jul. 31, 2023

(65) Prior Publication Data

US 2024/0339782 A1    Oct. 10, 2024

Related U.S. Application Data

(60) Provisional application No. 63/457,620, filed on Apr. 6, 2023.

(51) Int. Cl.
*G01R 31/28* (2006.01)
*H01R 12/79* (2011.01)
(Continued)

(52) U.S. Cl.
CPC ......... *G01R 31/2884* (2013.01); *H01R 12/79* (2013.01); *H01R 13/6205* (2013.01); *H01R 43/26* (2013.01); *H01R 2201/20* (2013.01)

(58) Field of Classification Search
CPC .... G01R 1/0416; G01R 1/0491; G01R 1/067; G01R 1/06705; G01R 1/073;
(Continued)

(56) References Cited

U.S. PATENT DOCUMENTS 5,828,224 A * 10/1998 Maruyama ........... G01R 1/0483
                                                        324/762.02
5,986,459 A * 11/1999 Fukaya ................ G01R 1/0483
                                                        324/762.01
(Continued)

FOREIGN PATENT DOCUMENTS

| CN | 103730747 B | 3/2016 |
| TW | 201411356 A | 3/2014 |
| WO | 2008049060 A2 | 4/2008 |

OTHER PUBLICATIONS

Chalas, Guadalupe et al., "Self-Aligning Magnetic Connectors Provide Optimal Power and Data Solutions for Medical Applications", Connector Supplier; Apr. 28, 2020; https://connectorsupplier.com/self-aligning-magnetic-connectors-provide-optimal-power-and-data-solutions-for-medical-applications; 11 pages.
(Continued)

*Primary Examiner* — Steven L Yeninas
(74) *Attorney, Agent, or Firm* — LOZA & LOZA, LLP; Gabriel Fitch

(57) ABSTRACT

An apparatus for coupling to an electrical interface of a circuit board includes a contact assembly and a base assembly. The contact assembly includes at least one contact-assembly magnet and a contact holder that is configured to retain the contact-assembly magnet. The contact holder includes an electrical-contact subassembly. The electrical-contact subassembly includes at least one electrical contact pin having a first end with an electrical contact configured to electrically couple with the electrical interface of the circuit board, and a second end configured to couple with a computer through a communication cable. The base assembly includes at least one base-assembly magnet, and a base holder configured to retain the base-assembly magnet. The contact assembly and base assembly magnetically couple in a coupled state based on a magnetic coupling force caused (Continued)

by the respective orientation of the contact-assembly magnet and the base-assembly magnet.

25 Claims, 22 Drawing Sheets

(51) Int. Cl.
*H01R 13/62* (2006.01)
*H01R 43/26* (2006.01)

(58) Field of Classification Search
CPC ............ G01R 1/07307; G01R 1/07314; G01R 1/07328; G01R 31/2886; G01R 31/2887; G01R 31/2889; G01R 31/2891; H01R 13/514

See application file for complete search history.

(56) References Cited

U.S. PATENT DOCUMENTS

| | | | |
|---|---|---|---|
| 7,758,349 B2 | 7/2010 | Han et al. | |
| 9,515,420 B2 | 12/2016 | Daoura | |
| 9,870,959 B1* | 1/2018 | Vodrahalli | H01L 24/81 |
| 10,726,183 B1* | 7/2020 | Tsai | G01R 31/2863 |
| 2001/0024128 A1* | 9/2001 | Hamren | G01R 31/2887 |
| | | | 324/756.02 |
| 2010/0062629 A1* | 3/2010 | Feldman | G01R 31/2889 |
| | | | 439/219 |
| 2016/0047844 A1* | 2/2016 | Wang | H05K 3/225 |
| | | | 29/837 |
| 2017/0123001 A1* | 5/2017 | Chigullapalli | G01R 1/0483 |
| 2021/0255219 A1* | 8/2021 | Cho | G01R 1/07364 |
| 2022/0146571 A1* | 5/2022 | Kim | G01R 31/2891 |
| 2025/0093411 A1* | 3/2025 | Lou | G01R 31/2868 |

OTHER PUBLICATIONS

"DTech FTDI USB to TTL Serial Adapter 3.3V Debug Cable 6 Pin Female Socket Header UART IC FT232RL Chip for Windows 11 10 8 7 Linux MAC (3ft, Black)", Amazon; Last accessed on Mar. 31, 2023; https://www.amazon.com/Serial-Adapter-Female-FT232RL-Windows/dp/B08BLKCXL4/ref=sr_1_1_sspa?keywords=usb%2Bto%2Buart&qid=1667805644&sr=8-1-spons&th=1; 1 page.

"ADALM-UARTJTAG", Analog Devices, Inc., Mar. 14, 2023; https://wiki.analog.com/university/tools/uartjtag; 4 pages.

"Maxnetic™ Spring-Loaded Connectors", New Electronics; Technology Spotlights; Sep. 1, 2022; https://www.newelectronics.co.uk/content/technology-spotlights/maxnetic-spring-loaded-connectors; 6 pages.

"Add a Serial/UART Breakout to your Raspberry Pi", Pimoroni; Digi-Key Electronics; Last accessed on Mar. 31, 2023; https://www.digikey.lu/en/maker/projects/add-a-serialuart-breakout-to-your-raspberry-pi/03ec57519b77491e96907d31063edf0c; 5 pages.

"RS232 to TTL Serial Interface Module", ElectronicsComp.com; Last accessed on Mar. 31, 2023; https://www.electronicscomp.com/rs232-to-ttl-serial-interface-module-4-pin; 8 pages.

* cited by examiner

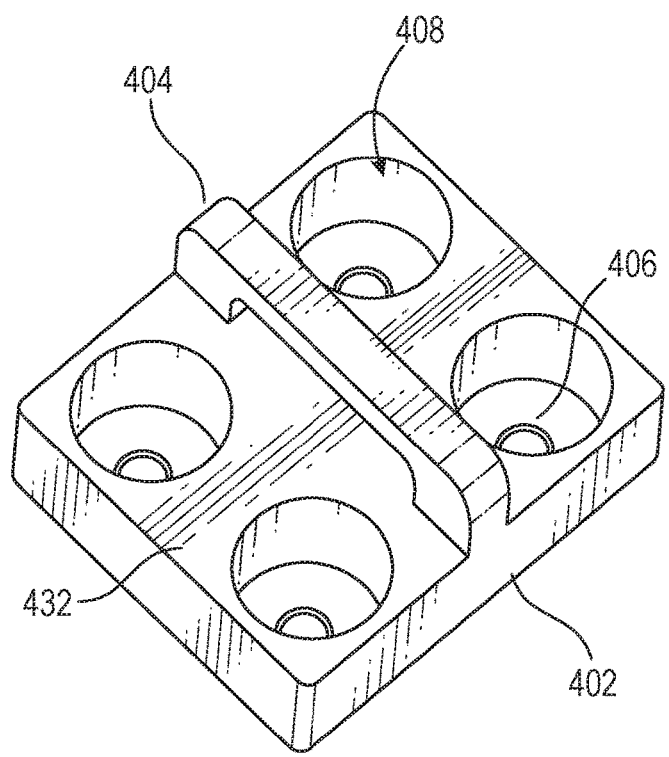
FIG. 4C
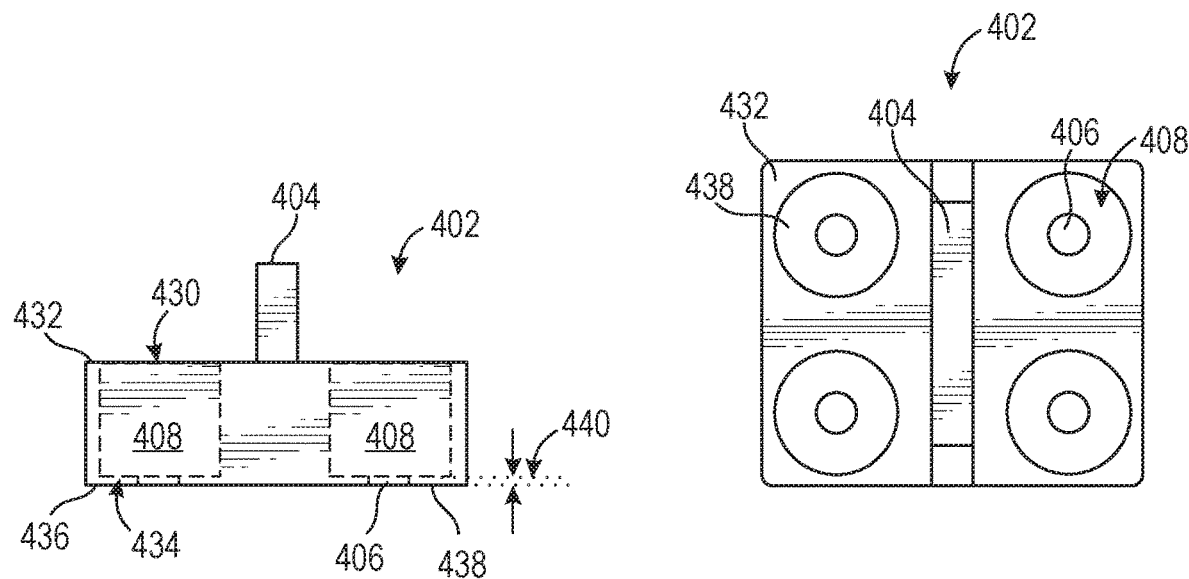
FIG. 4D
FIG. 4E

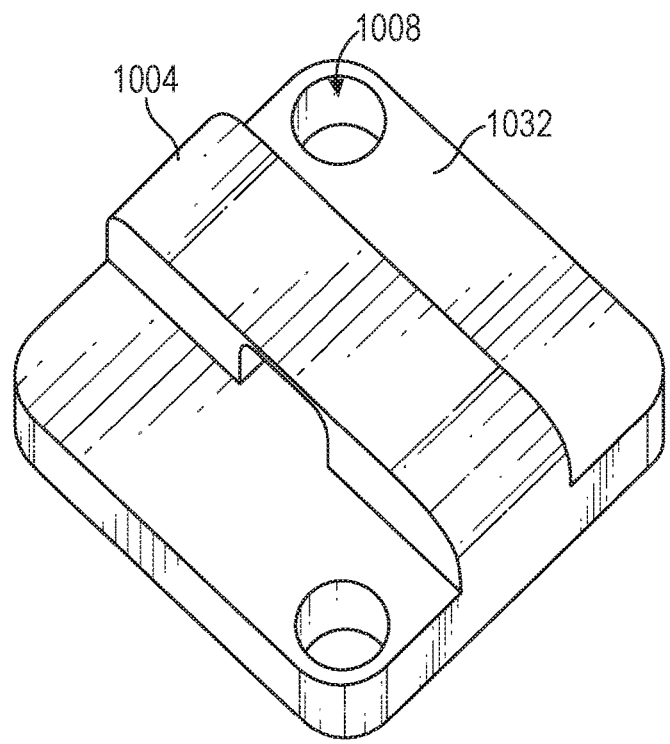
FIG. 10C
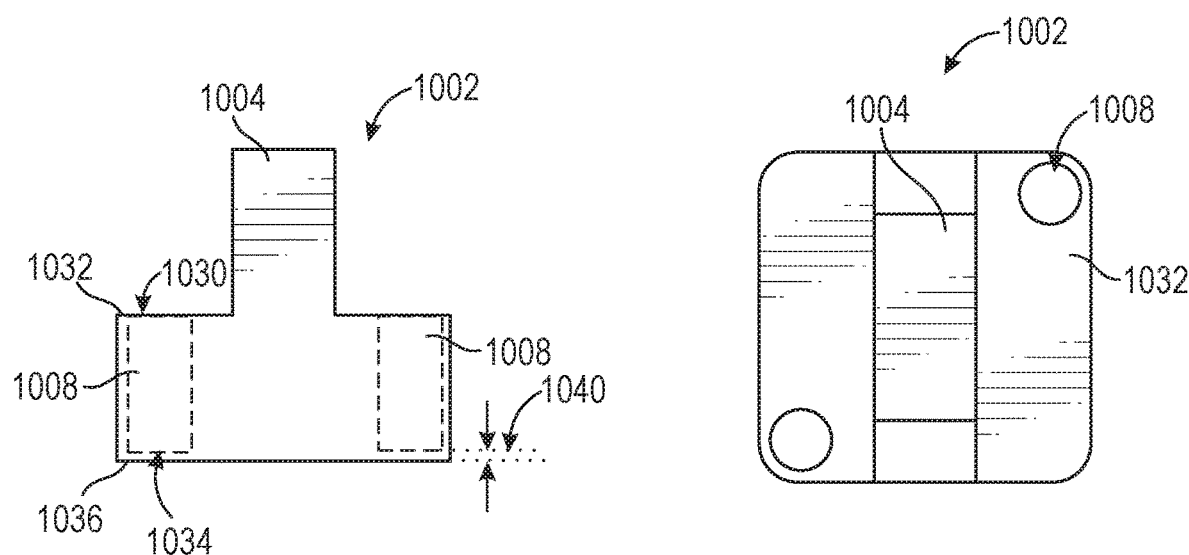
FIG. 10D  FIG. 10E

APPARATUS AND METHOD FOR COUPLING TO AN ELECTRICAL INTERFACE OF A CIRCUIT BOARD

CROSS-REFERENCE TO RELATED APPLICATIONS

This application claims priority to and the benefit of U.S. Provisional Patent Application No. 63/457,620, filed on Apr. 6, 2023 entitled. "APPARATUS AND METHOD FOR COUPLING TO AN ELECTRICAL INTERFACE OF A CIRCUIT BOARD," the entire content of which is incorporated herein by reference.

FIELD

The disclosure relates, in some embodiments, to apparatuses and method for performing failure analysis and firmware update of one or more components of a circuit board. More specifically, but not exclusively, the disclosure relates to apparatuses and methods for quickly and easily coupling to an electrical interface of a circuit board without requiring any rework, e.g., soldering, of the circuit board.

INTRODUCTION

Failure analysis and firmware update for an input/output module (IOM) circuit board assembly requires communication between a computer and a communication pad or electrical interface of the circuit board. Conventional means for establishing this communication include temporarily soldering wires at one end of a communication cable to pin or pad connectors on the circuit board and connecting the other end of the communication cable to the computer. Upon completion of the failure analysis and firmware update, the wires are desoldered from the pin connectors.

Soldering and desoldering wires to/from a circuit board can damage the circuit board. It is therefore desirable to provide a mechanism for temporarily connecting a computer to an electrical interface of circuit board without requiring soldering and desoldering.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides an apparatus for electrically coupling to an electrical interface of a circuit board. The apparatus includes a contact assembly and a base assembly. The contact assembly includes at least one contact-assembly magnet and a contact holder that is configured to retain the at least one contact-assembly magnet. The contact holder includes an electrical-contact subassembly. The electrical-contact subassembly includes at least one electrical contact pin having a first end with an electrical contact configured to electrically couple with the electrical interface of the circuit board, and a second end configured to couple with a computer through a communication cable. The base assembly includes at least one base-assembly magnet, and a base holder configured to retain the at least one base-assembly magnet. The contact assembly and base assembly magnetically couple in a coupled state based on a magnetic coupling force caused by the respective orientation of the at least one contact-assembly magnet and the at least one base-assembly magnet.

Another embodiment of the disclosure provides a test assembly. The test assembly includes the previously describe apparatus for electrically coupling to an electrical interface of a circuit board, and a test computer. The test computer is configured to be coupled to the second end of the at least one electrical contact pin, wherein the test computer is configured to communicate with the integrated circuit component using the at least one electrical contact pin and the electrical interface of the circuit board.

Another embodiment of the disclosure provides a method of electrically coupling with an electrical interface of a circuit board. The method includes placing a contact assembly adjacent a first-side surface of a circuit board to align one or more electrical contacts with one or more corresponding electrical interfaces of the circuit board. The method further includes placing a base assembly adjacent a second-side surface of the circuit board to magnetically couple the base assembly with the contact assembly and to electrically couple the one or more electrical contacts with the one or more corresponding electrical interfaces of the circuit board.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which:

FIG. 4C is a bottom perspective illustration of a base holder component of the base assembly of the apparatus of FIG. 2 in accordance with one or more aspects of the disclosure.

FIG. 4D is a sideview illustration of a base holder component of the base assembly of the apparatus of FIG. 2 in accordance with one or more aspects of the disclosure.

FIG. 4E is a plan view illustration of a base holder component of the base assembly of the apparatus of FIG. 2 in accordance with one or more aspects of the disclosure.

FIG. 10C is a top perspective illustration of a base holder component of the base assembly of the apparatus of FIG. 8 in accordance with one or more aspects of the disclosure.

FIG. 10D is a sideview illustration of a base holder component of the base assembly of the apparatus of FIG. 8 in accordance with one or more aspects of the disclosure.

FIG. 10E is a plan view illustration of a base holder component of the base assembly of the apparatus of FIG. 8 in accordance with one or more aspects of the disclosure.

DETAILED DESCRIPTION

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Figure 1:
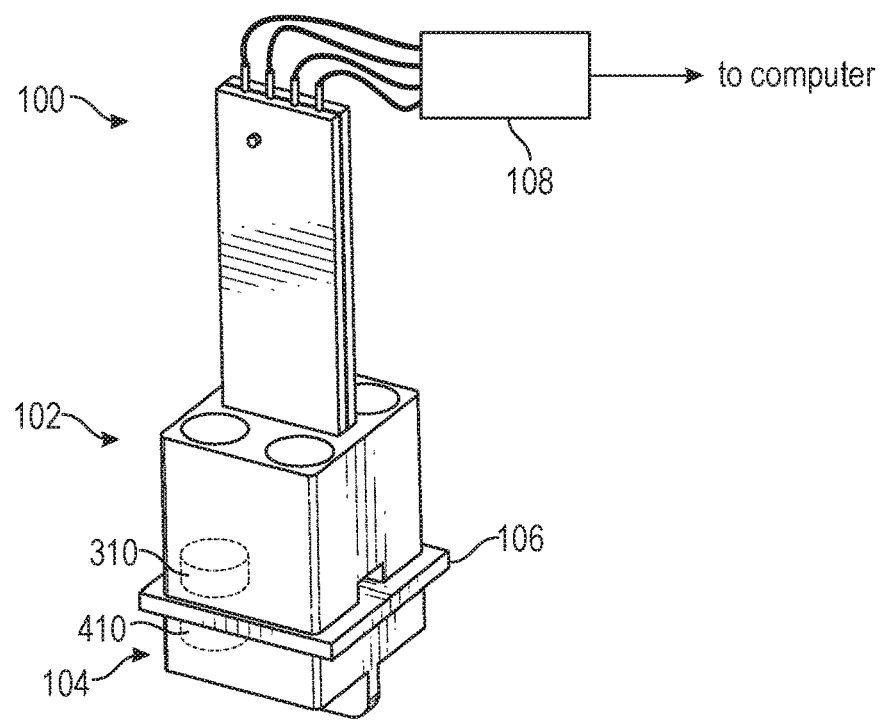
FIG. 1 is a perspective illustration of an apparatus coupled to a circuit board in accordance with one or more aspects of the disclosure.
Figure 2:
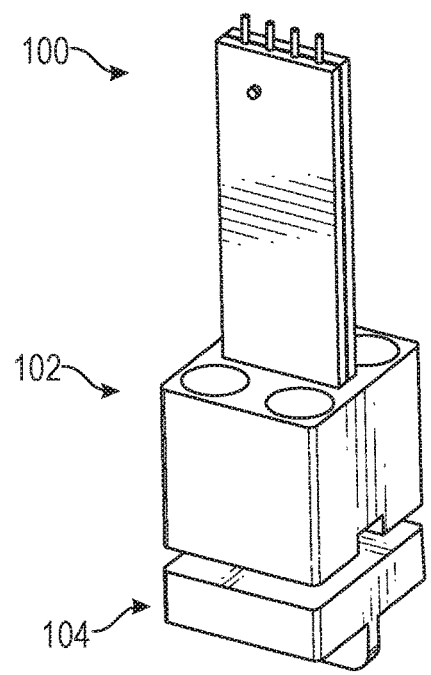
FIG. 2 is a perspective illustration of the apparatus of FIG. 1 including a contact assembly and a base assembly in accordance with one or more aspects of the disclosure.

With reference to FIGS. 1 and 2, in accordance with embodiments disclosed herein, an apparatus 100 for coupling to an electrical interface of a circuit board includes a contact assembly 102 and a base assembly 104. The apparatus 100 may be used to perform failure analysis and/or firmware updates for an input/output module (IOM) board assembly. In a use case, the base assembly 104 is positioned on one side (e.g., bottom side) of a circuit board 106, underneath a universal asynchronous receiver/transmitter (UART) communication pad that is located on the opposite side (e.g., top side) of the circuit board, while the contact assembly 102 is placed over the UART communication pad. Magnets 310, 410 associated with the contact assembly 102 and a base assembly 104 provide a magnet force that pulls and holds the contact assembly 102 and the base assembly 104 together through the intervening circuit board 106. When held together as such, electrical contact pins of the contact assembly 102 are held in electrical contact with contacts of the communication pad. The base assembly 104 provides structural support beneath the communication pad. The contact assembly 102 electrically connects each electrical contact to a connector 108, e.g., a USB connector, that interfaces with a computer that executes failure analysis and/or firmware updates.

With reference to FIGS. 3A-3F, the contact assembly 102 includes an electrical-contact subassembly 302, a contact holder 304, and at least one contact-assembly magnet 310. In the embodiment of FIGS. 3A-3F, the contact assembly 102 includes four contact-assembly magnets 310. However, more or less than four contact-assembly magnets 310 may be included in a contact assembly 102. In one configuration, the contact-assembly magnets 310 have a diameter of 6 millimeters (mm) and are 3 mm thick.

The contact holder 304 is configured to retain the contact-assembly magnets 310. To this end, the contact holder 304 includes a number of receptacles 308 and each contact-assembly magnet 310 is retained within a respective receptacle 308. The receptacles 308 are located near the four corners of the contact holder 304, to place the retained contact-assembly magnets 310 at a preselected distance from the electrical-contact subassembly 302. This helps to reduce the possibility of electromagnetic interference with electrical components of the electrical-contact subassembly 302. In some embodiments, the contact holder 304 is formed of a hard plastic material, e.g., a polymer. In some embodiments, the contact holder 304 is manufactured using a three-dimensional (3D) printing machine and a printing program that creates the receptacles 308.

With continued reference to FIGS. 3A-3F, in some embodiments, the receptacles 308 extend between a first end 330 at a first surface 332 of the contact holder 304 and a second end 334 at second surface 336 of the contact holder. The receptacles 308 are open at the first end 330 to receive the contact-assembly magnet 310, and partially closed at the second end 334 by an annular rim 338. The annular rim 338 positions the contact-assembly magnet 310 within the contact holder 304 at a preselected distance 340 from the second surface 336. In other words, and with additional reference to FIG. 6B, the annular rim 338 provides a physical barrier with a thickness 340 between a surface of the contact-assembly magnet 310 and a surface of a circuit board 106. In some embodiments, the thickness 340 is in the range of 0.2 to 0.8 mm, and in one example configuration is 0.4 mm. The annular rim 338 also defines a hole 306 at the second surface 336 of the contact holder 304.

Figure 6A:
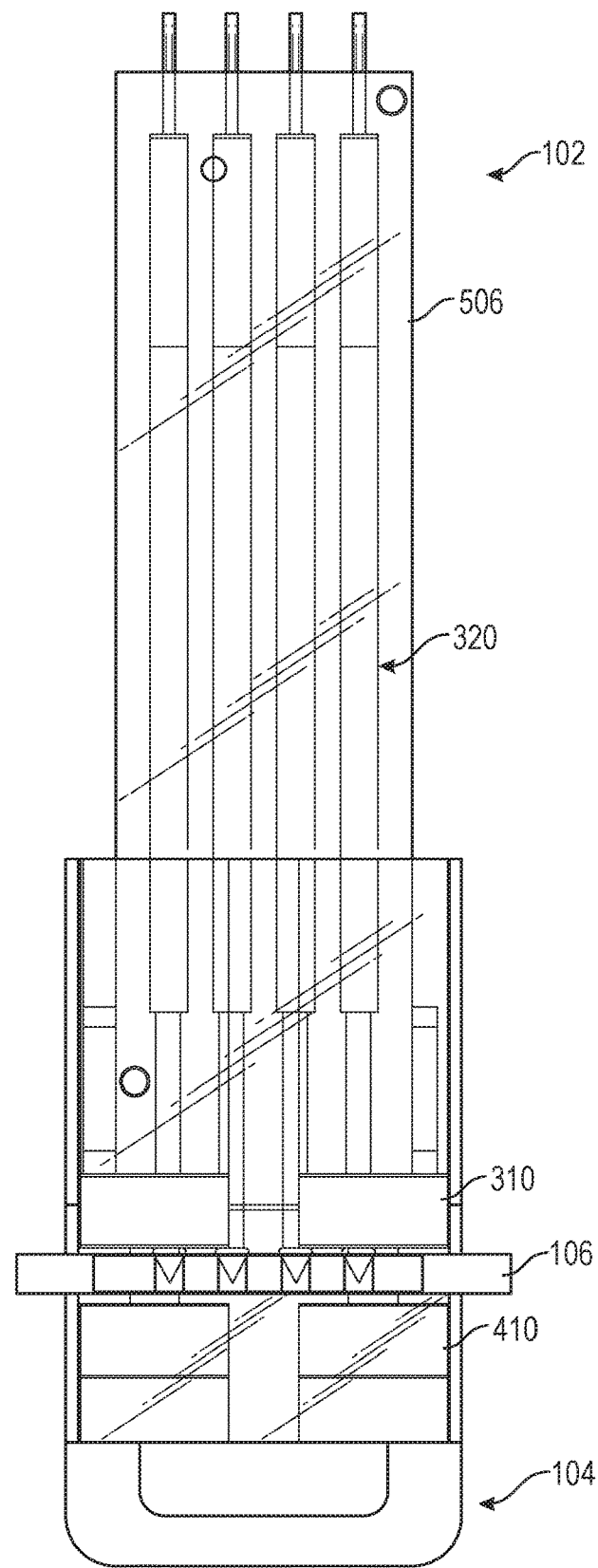
FIGS. 6A and 6B are illustrations of the apparatus of FIG. 2 coupled to an electrical interface of a circuit board in accordance with one or more aspects of the disclosure.
Figure 6B:
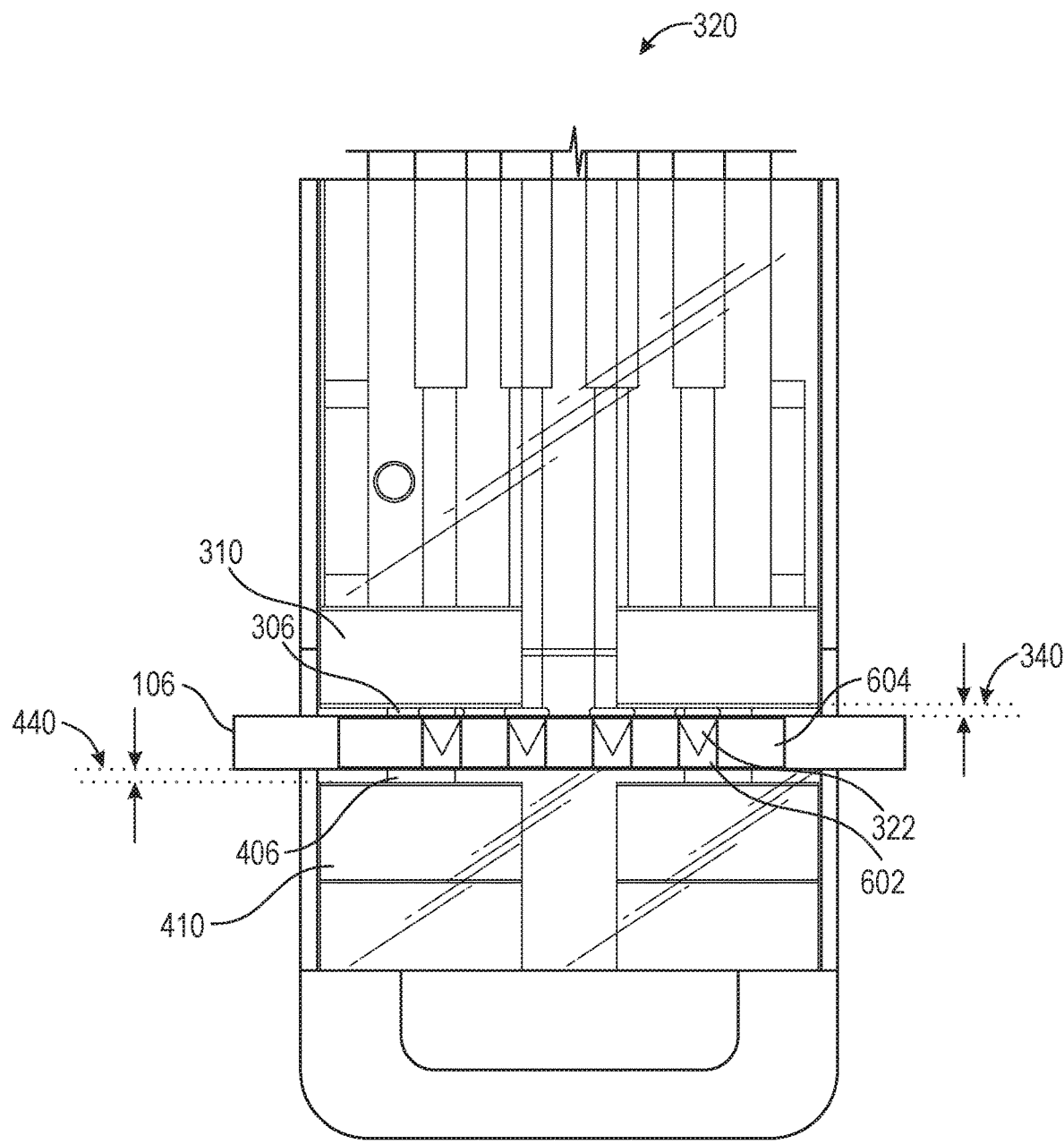

The contact-assembly magnets 310 are configured to mechanically couple with the contact holder 304 through the receptacles 308 and to be secured within the receptacles 308. To this end, the cross-section shape of the receptacles 308 are similar to the cross-section shape of the contact-assembly magnets 310. To secure the contact-assembly magnets 310 within the receptacles 308, the receptacle 308 includes a tapered portion having a dimension, e.g., diameter, slightly less than a corresponding dimension of the contact-assembly magnets 310. This difference in dimension provides a friction fit that secures the contact-assembly magnets 310 at the tapered portion within the receptacles 308 of the contact holder 304, as shown in FIGS. 6A and 6B.

During mechanical coupling of the contact-assembly magnets 310 with the contact holder 304, a sufficient push force is applied to the contact-assembly magnets 310 to advance the contact-assembly magnets 310 along the length of the receptacle 308 until the surface of the contact-assembly magnets 310 encounters the annular rim 338. At this stage, the contact-assembly magnets 310 may be secured at its location in the receptacle 308 by a friction fit provided by a reduced-diameter, tapered portion of the receptacle 308. The contact-assembly magnets 310 are commonly oriented in the receptacles 308 so that the same pole, e.g., north or south, of each contact-assembly magnets 310 faces the second surface 336 of the contact holder 304.

In some embodiments, the void of the receptacle 308 that remains after a contact-assembly magnet 310 is inserted into the receptacle 308 is filled with a suitable material, e.g., epoxy. In some embodiments, the void is retained. As such, a contact-assembly magnet 310 may subsequently be removed from the receptacle 308 upon application of a push force sufficient to overcome the friction fit. This push force may be applied to the contact-assembly magnets 310 through the hole 306. Removal of the contact-assembly magnet 310 may be desired, for example, to replace a contact-assembly magnet 310 having insufficient magnetic coupling force or to change the magnetic orientation of a contact-assembly magnet 310.

In some embodiments, the contact holder 304 and the electrical-contact subassembly 302 are integral. Integral in this context means the contact holder 304 and the electrical-contact subassembly 302 are manufactured and/or assembled as a unitary structure and are not intended to be separable. In some embodiments, the electrical-contact subassembly 302 is a separate component and the contact holder 304 is configured to receive and retain the electrical-contact subassembly 302, and to allow for removal of the electrical-contact subassembly 302. To this end, the contact holder 304 includes a slot 312 configured to retain the electrical-contact subassembly 302. In some embodiments, the contact holder 304 is formed of a hard plastic material, e.g., a polymer. In some embodiments, the contact holder 304 is manufactured using a three-dimensional (3D) printing machine and a printing program that creates the slot 312.

Figure 5A:
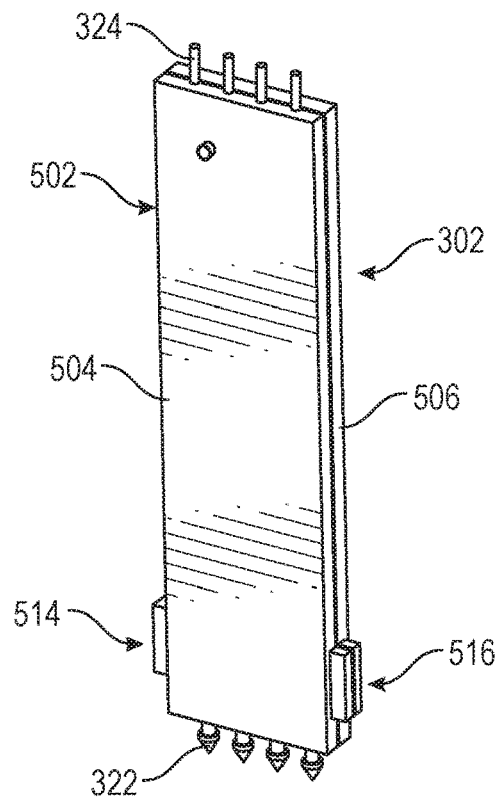
FIG. 5A is a perspective illustration of an electrical contact subassembly of the contact assembly of the apparatus of FIG. 3A in accordance with one or more aspects of the disclosure.
Figure 5B:
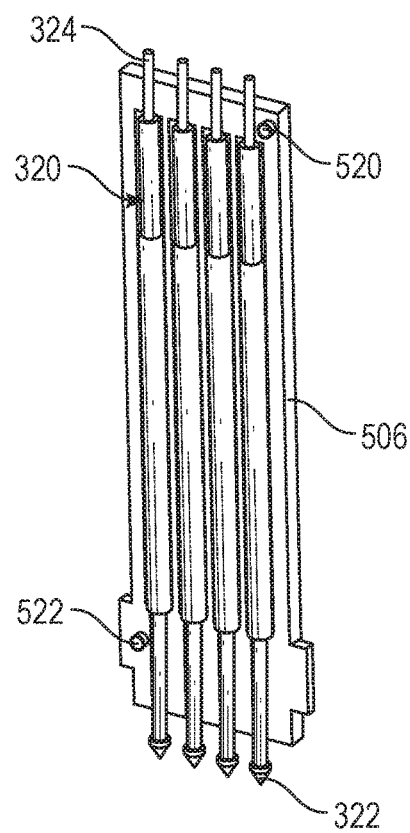
FIG. 5B is a perspective illustration of a portion of an electrical contact subassembly of the contact assembly of the apparatus of FIG. 3A in accordance with one or more aspects of the disclosure.
Figure 5C:
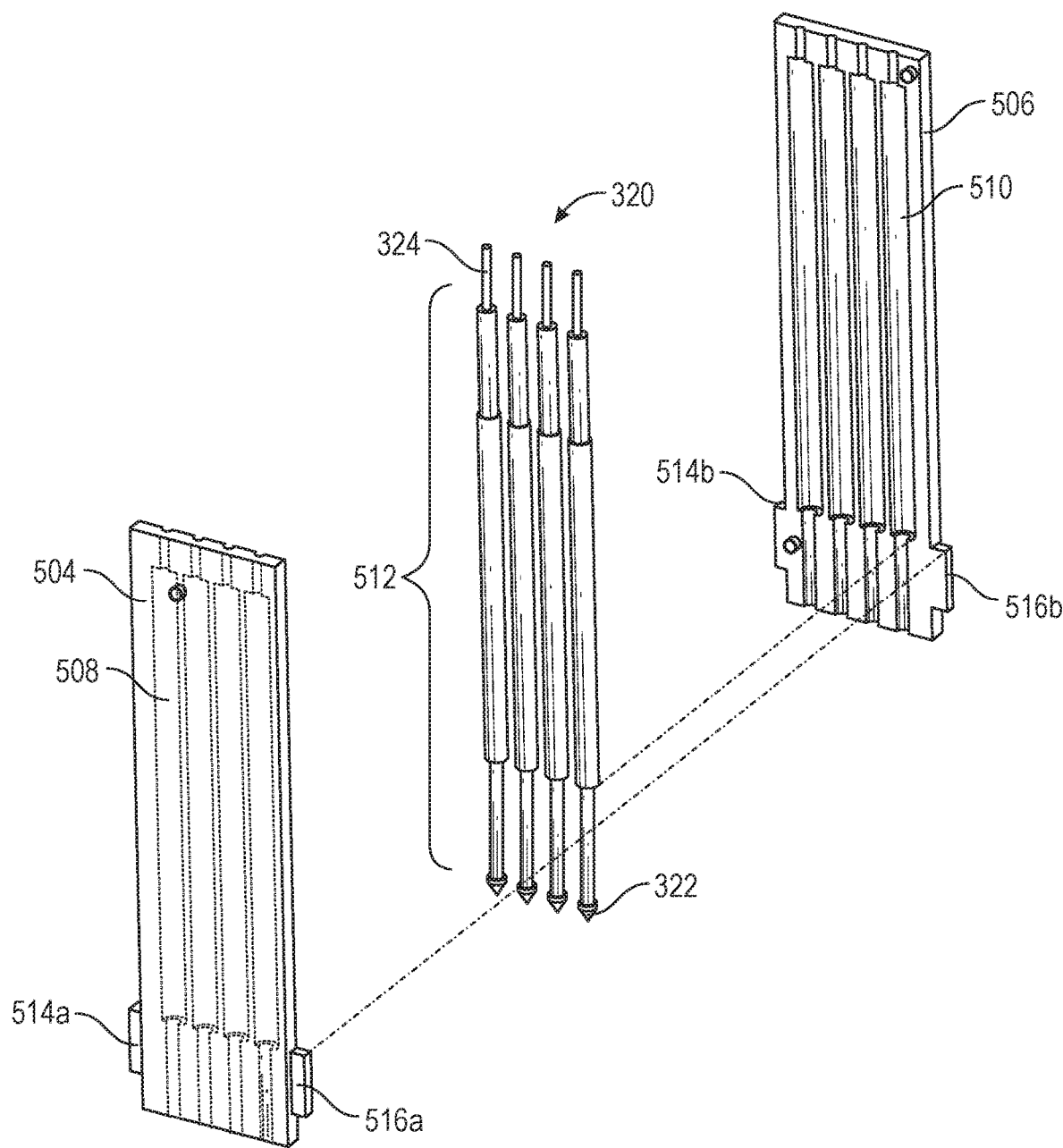
FIG. 5C is an exploded illustration of the electrical contact subassembly of FIG. 5A in accordance with one or more aspects of the disclosure.

With reference to FIGS. 5A-5C, the electrical-contact subassembly 302 includes four electrical contact pins 320 and a housing 502. Each electrical contact pin 320 has a first end 322 with an electrical contact and a second end 324. The electrical contact pins 320 are configured to normally bias the first end 322 in a direction away from the second end 324, and to move the first end 322 toward the second end 324 when the first end 322 encounters a force greater than the bias force. To this end, the electrical contact pins 320 may comprise a spring-loaded, pogo-pin structure at the first end 322 having a bias force. The housing 502 is configured to retain the electrical contact pins 320 and to fit within the slot 312 of the contact holder 304.

In the embodiment of FIGS. 5A-5C, the electrical-contact subassembly 302 includes four electrical contact pins 320 arranged in a linear array. However, more or less than four electrical contact pins 320 may be included in an electrical-contact subassembly 302. The total bias force of the electrical-contact subassembly 302 is equal to the bias force of an electrical contact pin 320, multiplied by the number of electrical contact pins in the electrical-contact subassembly. For example, in some embodiments an electrical contact pin 320 has a spring-loaded, bias force of approximately 70.9 gram·force (gr·f)/2.5 ounce·force (oz·f). Thus, an electrical-contact subassembly 302 with four electrical contact pins, such as shown in FIGS. 5A-5C, has a bias force of approximately 283.5 gr·f/10 oz·f.

The housing 502 includes a first face 504 and a second face 506. The first face 504 has four pin channels 508 formed in the thickness of its material. Each pin channel 508 is configured to receive a central portion 512 of an electrical contact pin 320. Similarly, the second face 506 has four pin channels 510 formed in the thickness of its material, each configured to receive the central portion 512 of an electrical contact pin 320.

The first face 504 and a second face 506 are configured to be mechanically coupled together to secure the electrical contact pins 320 in place between the faces. Mechanical coupling may be provided by mechanical features 520, 522 of the second face 506 that are configured to mate with complementary mechanical features (not visible) of the first face 504. When mechanically coupled together, the first face 504 and the second face 506 enclose the central portion 512 of each of the plurality of electrical contact pins 320, while leaving the first end 322 with the electrical contact, and the second end 324 exposed. When coupled, the first face 504 and the second face 506 form mechanical stops 514, 516 that extend outward from the housing 502. As described below, these mechanical stops 514, 516 function to place the fast ends 322 of the electrical contact pins 320 at an appropriate location relative to the contact holder 304.

The electrical-contact subassembly 302 is configured to mechanically couple with the contact holder 304 through the slot 312 and to be secured within the slot 312. To this end, the cross-section shape of the slot 312 is similar to the cross-section shape of the electrical-contact subassembly 302. To secure the electrical-contact subassembly 302 within the slot 312 one or more dimensions of a portion of the slot 312 may be slightly less than corresponding dimensions of the electrical-contact subassembly 302. This difference in one or more dimensions provides a friction fit that secures the electrical-contact subassembly 302 within the slot 312 of contact holder 304.

Figure 3A:
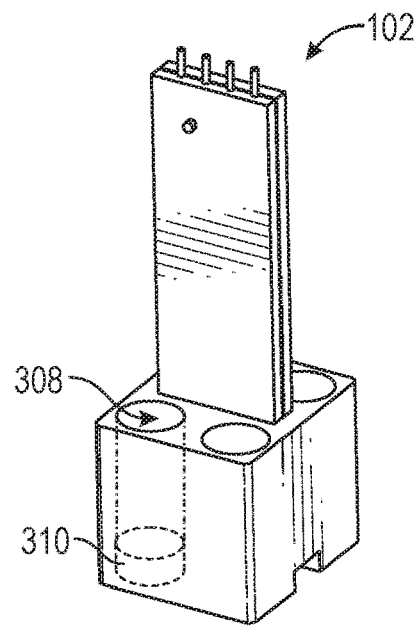
FIG. 3A is a perspective illustration of the contact assembly of the apparatus of FIG. 2 in accordance with one or more aspects of the disclosure.
Figure 3B:
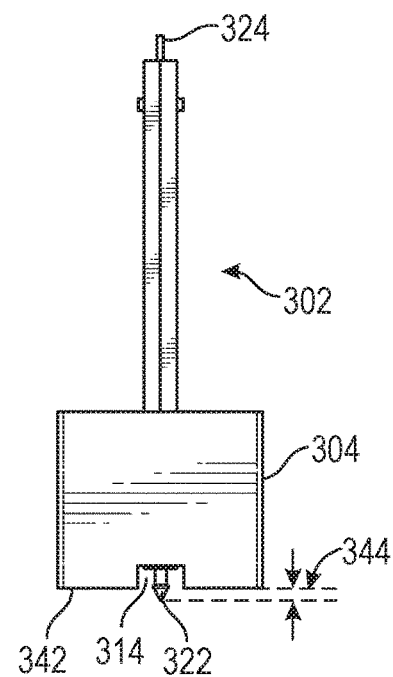
FIG. 3B is a sideview illustration of the contact assembly of the apparatus of FIG. 2 in accordance with one or more aspects of the disclosure.
Figure 3C:
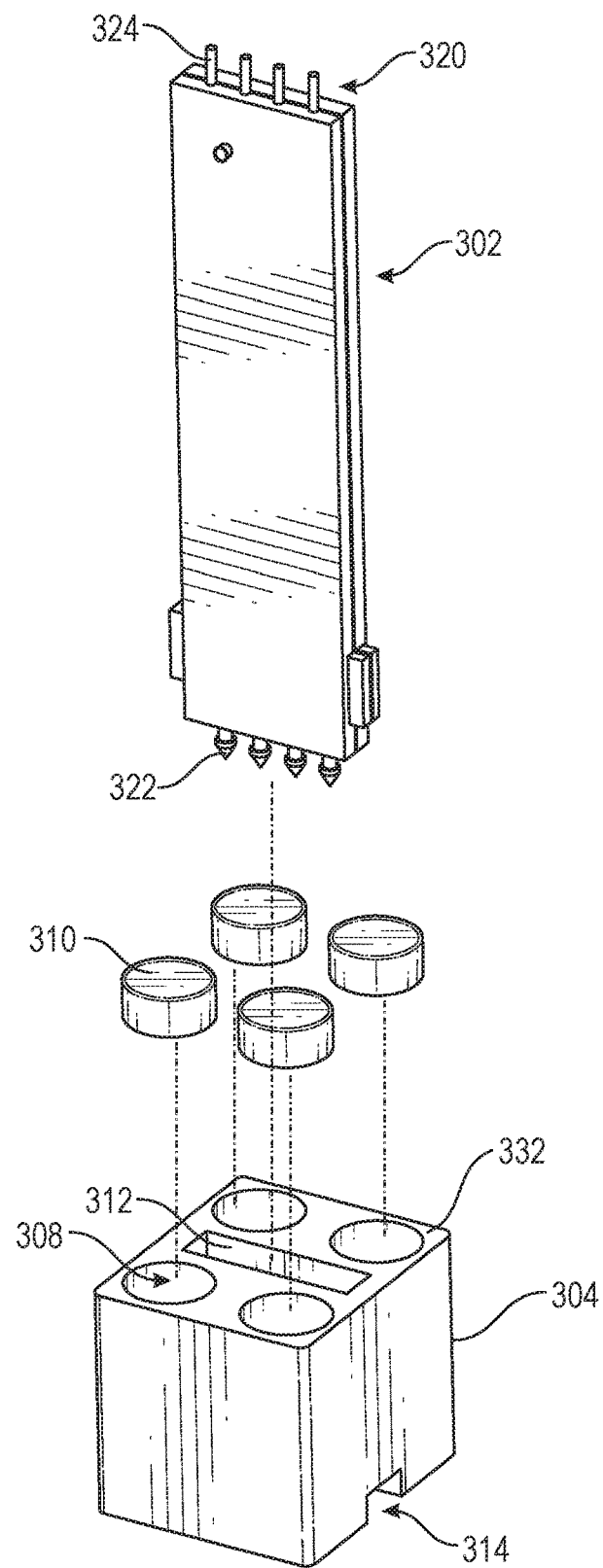
FIG. 3C is an exploded illustration of the contact assembly of the apparatus of FIG. 2 in accordance with one or more aspects of the disclosure.
Figure 3D:
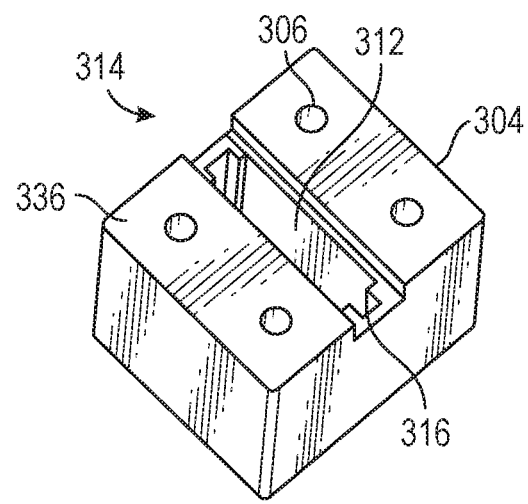
FIG. 3D is a bottom perspective illustration of a contact holder component of the contact assembly of the apparatus of FIG. 2 in accordance with one or more aspects of the disclosure.
Figure 3E:
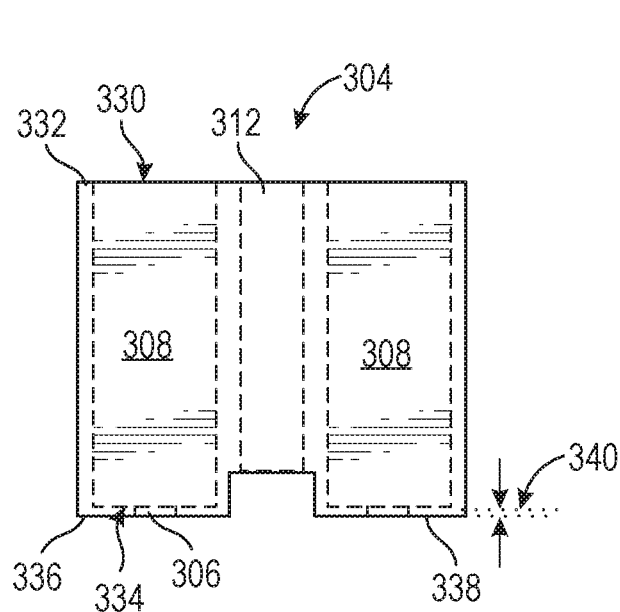
FIG. 3E is a sideview illustration of a contact holder component of the contact assembly of the apparatus of FIG. 2 in accordance with one or more aspects of the disclosure.
Figure 3F:
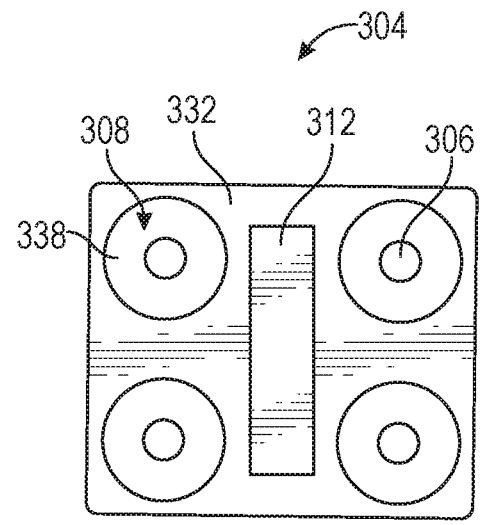
FIG. 3F is a plan view illustration of a contact holder component of the contact assembly of the apparatus of FIG. 2 in accordance with one or more aspects of the disclosure.
Figure 4A:
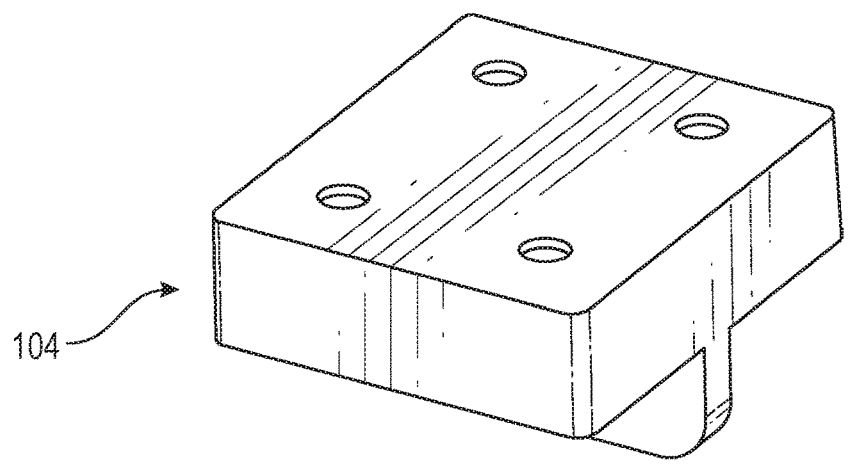
FIG. 4A is a perspective illustration of the base assembly of the apparatus of FIG. 2 in accordance with one or more aspects of the disclosure.
Figure 4B:
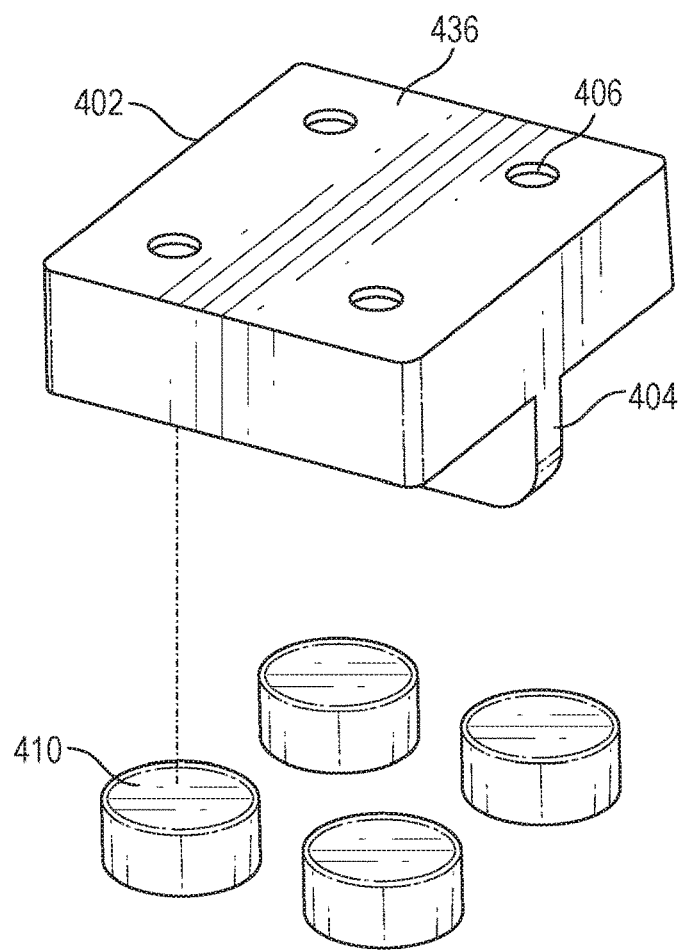
FIG. 4B is an exploded illustration of the base assembly of the apparatus of FIG. 2 in accordance with one or more aspects of the disclosure.

During mechanical coupling of the electrical-contact subassembly 302 and the contact holder 304, a sufficient push force is applied to the electrical-contact subassembly 302 to advance the electrical-contact subassembly 302 along the length or depth of the slot 312 until the mechanical stops 514, 516 encounter an interior surface (not visible) of the contact holder 304. At this location, the electrical-contact subassembly 302 is secured within the slot 312 by a friction fit. With reference to FIG. 3B, at this location the first ends 322 of the electrical contact pins 320 of the electrical-contact subassembly 302 are positioned within a channel 314 of the contact holder 304 and extend beneath the lower surface 342 of the contact holder 304 by a distance 344. In some embodiments, the distance 344 is in the range of 0.8 to 1.6 mm, and in one example configuration is 1.2 mm. If necessary, the electrical-contact subassembly 302 may be removed from the slot 312 upon application of sufficient pulling force. Removal of the electrical-contact subassembly 302 may be desired, for example, to replace an electrical-contact subassembly 302 having a damaged or failing electrical contact pin 320.

With reference to FIG. 6B, as disclosed above, the electrical contact pins 320 have a first end 322 with an electrical contact. The electrical contact is configured to electrically couple with an electrical interface 602 of a circuit board 106. For example, as shown in FIG. 6B, in some embodiments the first end 322 has a conical electrical contact that is sized to mate with and thereby electrically couple with an electrical interface 602 of a circuit board 106. The electrical interface 602 of the circuit board 106 may be an electrically conductive via having a conical void sized to receive the first end 322 of the electrical contact pin 320. Or the electrical interface 602 of the circuit board 106 may be a via having an electrically conductive inner wall that the first end 322 of the electrical contact pin 320 contacts. In either case, the first end 322 of the electrical contact pin 320 is configured to bias the first end 322 in the direction of the electrical interface 602.

With reference to FIGS. 4A-4E, the base assembly 104 of the apparatus 100 includes a base holder 402 and at least one base-assembly magnet 410. In the embodiment of FIGS. 4A-4E, the base assembly 104 includes four base-assembly magnets 410. However, more or less than four base-assembly magnets 410 may be included in a base assembly 104. In one configuration, the base-assembly magnets 410 have a diameter of 6 millimeters (mm) and are 3 mm thick. The base holder 402 includes a grip 404 for a person to hold while using the apparatus 100.

The base holder 402 is configured to retain the base-assembly magnets 410. To this end, the base holder 402 includes a number of receptacles 408 and each base-assembly magnet 410 is retained within a respective receptacle 408. The receptacles 408 are located near the four corners of the base holder 402, to place the retained base-assembly magnets 410 a distance from the electrical-contact subassembly 302 (i.e., more centrally located) when the contact assembly 102 and base assembly 104 are in the coupled state. This helps reduce the possibility of electromagnetic interference with electrical components of the electrical-contact subassembly 302. In some embodiments, the base holder 402 is formed of a plastic material. In some embodiments, the base holder 402 is manufactured using a three-dimensional (3D) printing machine and a printing program that creates the receptacles 408.

With continued reference to FIGS. 4A-4E, in some embodiments, the receptacles 408 extend between a first end 430 at a first surface 432 of the base holder 402 and a second end 434 at second surface 436 of the base holder 402. The receptacles 408 are open at the first end 430 to receive the magnet 410, and partially closed at the second end 434 by an annular rim 438. The annular rim 438 positions the base-assembly magnet 410 within the base holder 402 a distance 440 from the second surface 436. In other words, and with additional reference to FIG. 6B, the annular rim 438 provides a physical barrier with a thickness 440 between a surface of the base-assembly magnet 410 and a surface of a circuit board 106. In some embodiments, the thickness 440 is in the ranger of 0.2 to 0.8 mm, and in one example configuration is 0.4 mm. The annular rim 438 also defines a hole 406 at the second surface 436 of the base holder 402.

The base-assembly magnets 410 are configured to mechanically couple with the base holder 402 through the receptacles 408 and to be secured within the receptacles 408. To this end, the cross-section shape of the receptacles 408 are similar to the cross-section shape of the base-assembly magnets 410. To secure the base-assembly magnets 410 within the receptacles 408, the receptacle 408 includes a tapered portion having a dimension, e.g., diameter, slightly less than a corresponding dimension of the base-assembly magnets 410. This difference in dimension provides a friction fit that secures the base-assembly magnets 410 at the tapered portion within the receptacles 408 of the base holder 402, as shown in FIGS. 6A and 6B.

During mechanical coupling of the base-assembly magnets 410 with the base holder 402, a sufficient push force is applied to the base-assembly magnets 410 to advance the base-assembly magnets 410 along the length of the receptacle 408 until the surface of the base-assembly magnets 410 encounters the annular rim 438. At this stage, the base-assembly magnets 410 may be secured at its location in the receptacle 408 by a friction fit provided by a reduced-diameter, tapered portion of the receptacle 408. The base-assembly magnets 410 are commonly oriented in the receptacles 408 so that the same pole. e.g., north or south, of each base-assembly magnets 410 faces the second surface 436 of the base holder 402. Furthermore, the orientation of the base-assembly magnets 410 is opposite that of the contact-assembly magnets 310. For example, if the contact-assembly magnets 310 are oriented with their south pole facing the second surface 336 of the contact holder 304, then the base-assembly magnets 410 are oriented with their north pole facing the second surface 436 of the base holder 402.

In some embodiments, the void of the receptacle 408 that remains after a base-assembly magnet 410 is inserted into the receptacle 408 is filled with a suitable material, e.g., epoxy. In some embodiments, the void is retained. As such, a base-assembly magnet 410 may subsequently be removed from a receptacle 408 upon application of a push force sufficient to overcome the friction fit. This push force may be applied to the base-assembly magnet 410 through the hole 406. Removal of a base-assembly magnet 410 may be desired, for example, to replace a base-assembly magnet 410 having insufficient magnetic coupling force or to change the magnetic orientation of a base-assembly magnet 410.

With reference to FIGS. 6A and 6B, in use of the apparatus 100, the base assembly 104 is positioned on one side (e.g., bottom side/surface) of a circuit board 106, underneath an electrical interface pad 604, e.g., an UART communication pad, that is located on the opposite side (e.g., top side/surface) of the circuit board 106, while the contact assembly 102 is placed over the electrical interface pad 604. Note that in FIGS. 6A and 6B, components on either side of the circuit board 106 are not shown for clarity of illustration. The contact-assembly magnets 310 associated with the contact assembly 102 and the base-assembly magnets 410 associated with the base assembly 104 provide a magnet force that pulls and holds the contact assembly 102 and the base assembly 104 together, through the intervening circuit board 106. When held together as such, the electrical contacts 322 of the contact assembly 102 are biased toward and pressed into electrical contact with electrical interfaces (e.g., pin receptacles) 602 of the electrical interface pad 604.

The size of the contact-assembly magnets 310 and the base-assembly magnets 410 are designed (and/or selected) to provide a magnet coupling force through the thickness of the circuit board 106 and the respective thicknesses of the contact-holder annular rim 338 and base-holder annular rim 438, sufficient to pull and hold the contact assembly 102 and the base assembly 104 together. The magnetic coupling force, however, is not so strong as to electromagnetically interfere with electrical signals passing through the electrical-contact subassembly 302. In some embodiments, the magnetic coupling force provided by the contact-assembly magnets 310 and the base-assembly magnets 410 is greater than the biasing force of the electrical-contact subassembly 302. For example, as described above, in some embodiments the electrical-contact subassembly 302 has a bias force of approximately 283.5 gr·f/10 oz·f. Thus, in this configuration the magnetic coupling force provided by the contact-assembly magnets 310 and the base-assembly magnets 410 is greater than 283.5 gr·f/10 oz·f. As previously mentioned, the contact-assembly magnets 310 and the base-assembly magnets are retained a distance from the electrical-contact subassembly 302. This distance reduces the amount of magnet force in the region of the electrical-contact subassembly 302.

With continued reference to FIG. 6B, features of the apparatus 100 protect the circuit board 106 from damage while the apparatus is magnetically coupled to the circuit board 106. For example, the contact assembly 102 maintains the contact-assembly magnets 310 a distance 340 away from the surface of the circuit board 106. Likewise, the base assembly 104 maintains the base-assembly magnets 410 a distance 440 away from the surface of the circuit board 106. As such, the surfaces of the magnets 310, 410 do not contact the circuit board 106, and therefore cannot damage (or minimize any possible damage to) components or electrical traces on either side of the circuit board 106.

Figure 7:
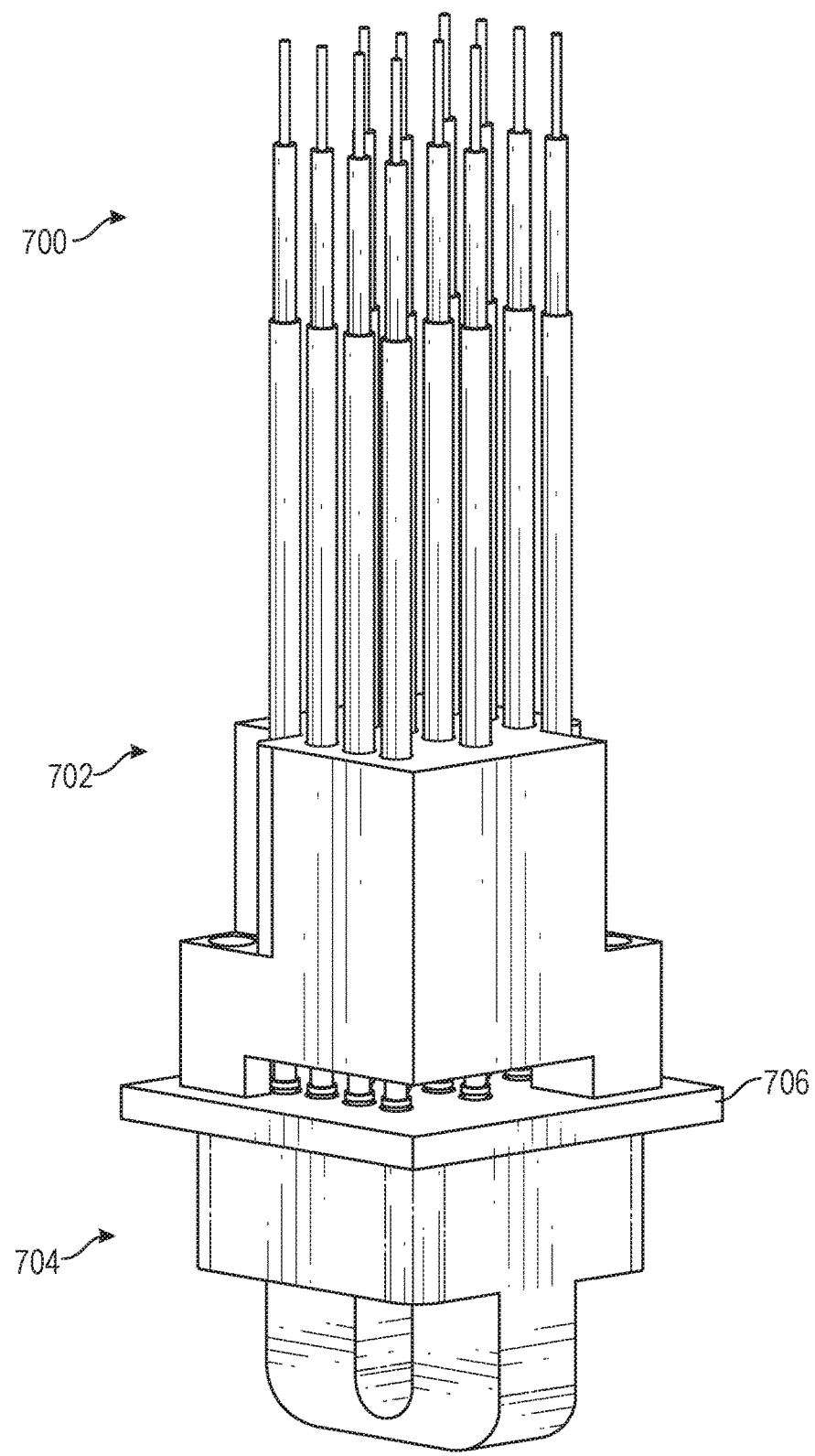
FIG. 7 is a perspective illustration of an apparatus coupled to a circuit board in accordance with one or more aspects of the disclosure.
Figure 8:
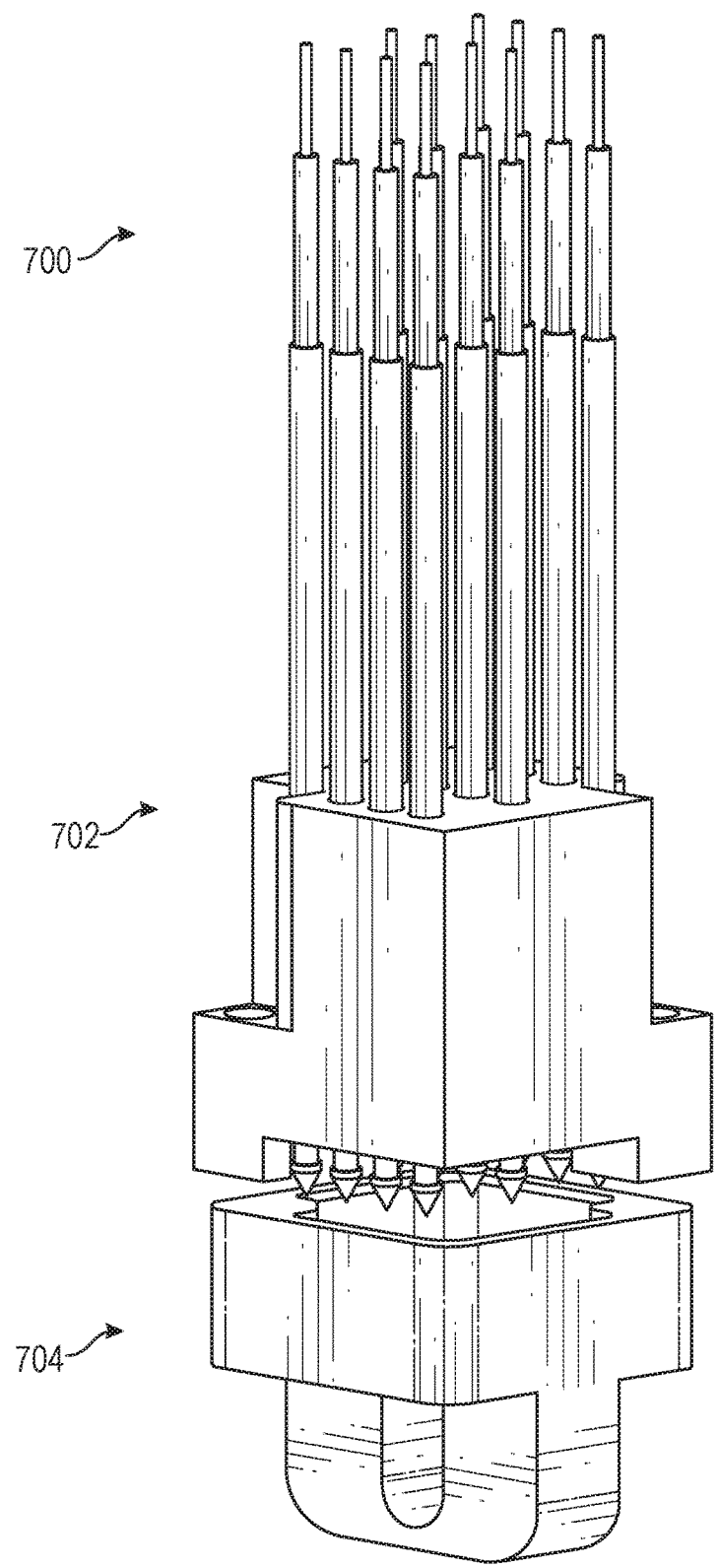
FIG. 8 is a perspective illustration of the apparatus of FIG. 7 including a contact assembly and a base assembly in accordance with one or more aspects of the disclosure.

With reference to FIGS. 7 and 8, in accordance with embodiments disclosed herein, an apparatus 700 for coupling to an electrical interface of a circuit board includes a contact assembly 702 and a base assembly 704. The apparatus 700 may be used to perform failure analysis and/or firmware updates for an input/output module (IOM) board assembly. In a use case, the base assembly 704 is positioned on one side (e.g., bottom side) of a circuit board 706, underneath a universal asynchronous receiver/transmitter (UART) communication pad that is located on the opposite side (e.g., top side) of the circuit board, while the contact assembly 702 is placed over the UART communication pad. Magnets 910, 1010 associated with the contact assembly 702 and a base assembly 704 provide a magnet force that pulls and holds the contact assembly 702 and the base assembly 704 together through the intervening circuit board 706. When held together as such, electrical contact pins of the contact assembly 702 are held in electrical contact with contacts of the communication pad. The base assembly 704 provides structural support beneath the communication pad. The contact assembly 702 electrically connects each electrical contact to a connector 708, e.g., a USB connector, that interfaces with a computer that executes failure analysis and firmware update.

With reference to FIGS. 9A-9F, the contact assembly 702 includes an electrical-contact subassembly 902, a contact holder 904, and at least one contact-assembly magnet 910. In the embodiment of FIGS. 9A-9F, the contact assembly 702 includes two contact-assembly magnets 910. However, more or less than two contact-assembly magnets 910 may be included in a contact assembly 702. In one configuration, the contact-assembly magnets 910 have a diameter of 3 millimeters (mm) and are 3 mm thick.

The contact holder 904 is configured to retain the contact-assembly magnets 910. To this end, the contact holder 904 includes a number of receptacles 908 and each contact-assembly magnet 910 is retained within a respective receptacle 908. The receptacles 908 are located near opposite corners of the contact holder 904, to place the retained contact-assembly magnets 910 at a preselected distance from the electrical-contact subassembly 902. This helps to reduce the possibility of electromagnetic interference with electrical components of the electrical-contact subassembly 902. In some embodiments, the contact holder 904 is formed of a hard plastic material, e.g., a polymer. In some embodiments, the contact holder 904 is manufactured using a three-dimensional (3D) printing machine and a printing program that creates the receptacles 908.

With continued reference to FIGS. 9A-9F, in some embodiments, the receptacles 908 extend between a first end 930 at a first surface 932 of the contact holder 904 and a second end 934 at second surface 936 of the contact holder. The receptacles 908 are open at the first end 930 to receive the contact-assembly magnet 910, and closed at the second end 934. The closed second end 934 positions the contact-assembly magnet 910 within the contact holder 904 at a preselected distance 940 from the second surface 936. In other words, and with additional reference to FIG. 11B, the closed second end 934 provides a physical barrier with a thickness 940 between a surface of the contact-assembly magnet 910 and a surface of a circuit board 706. In some embodiments, the thickness 940 is in the range of 0.2 to 0.8 mm, and in one example configuration is 0.5 mm.

Figure 11A:
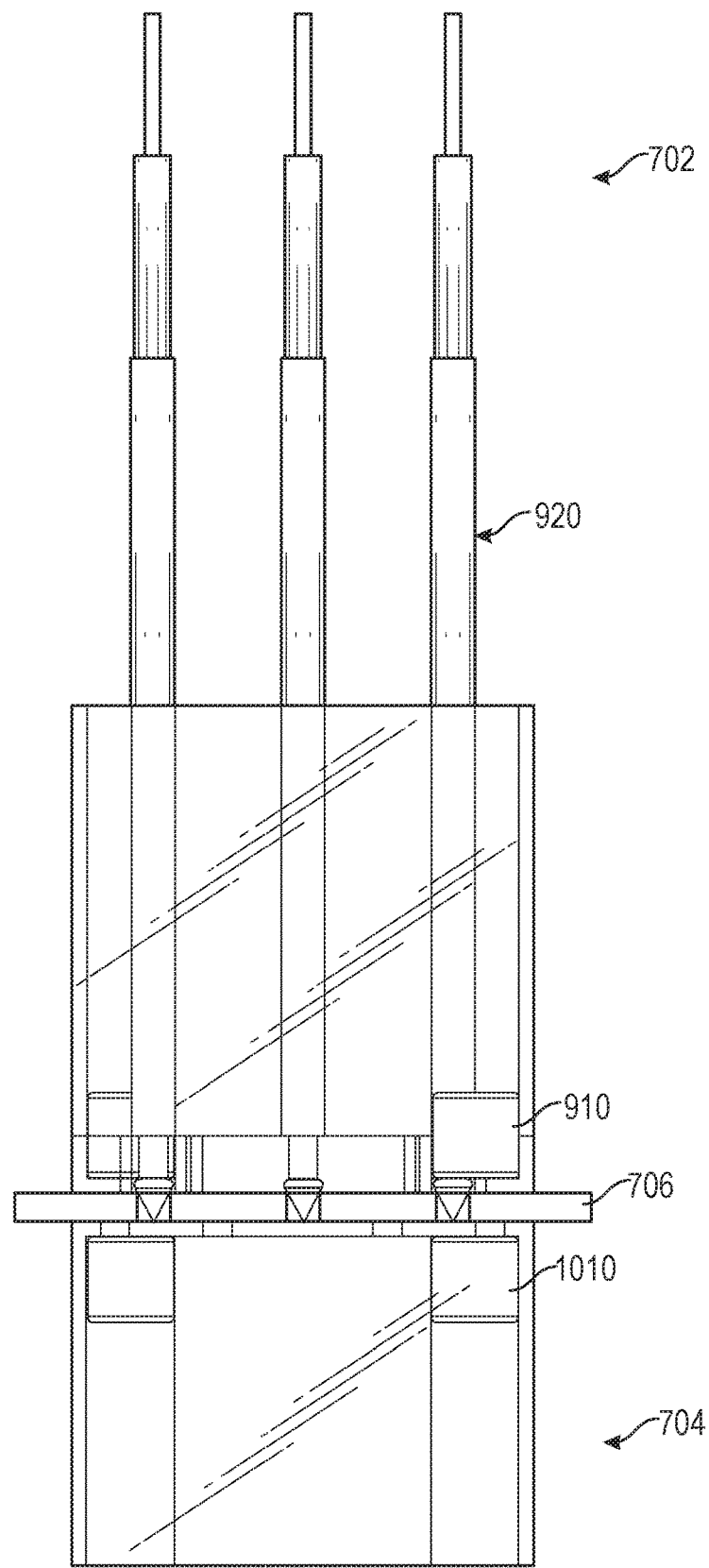
FIGS. 11A and 11B are illustrations of the apparatus of FIG. 8 coupled to an electrical interface of a circuit board in accordance with one or more aspects of the disclosure.
Figure 11B:
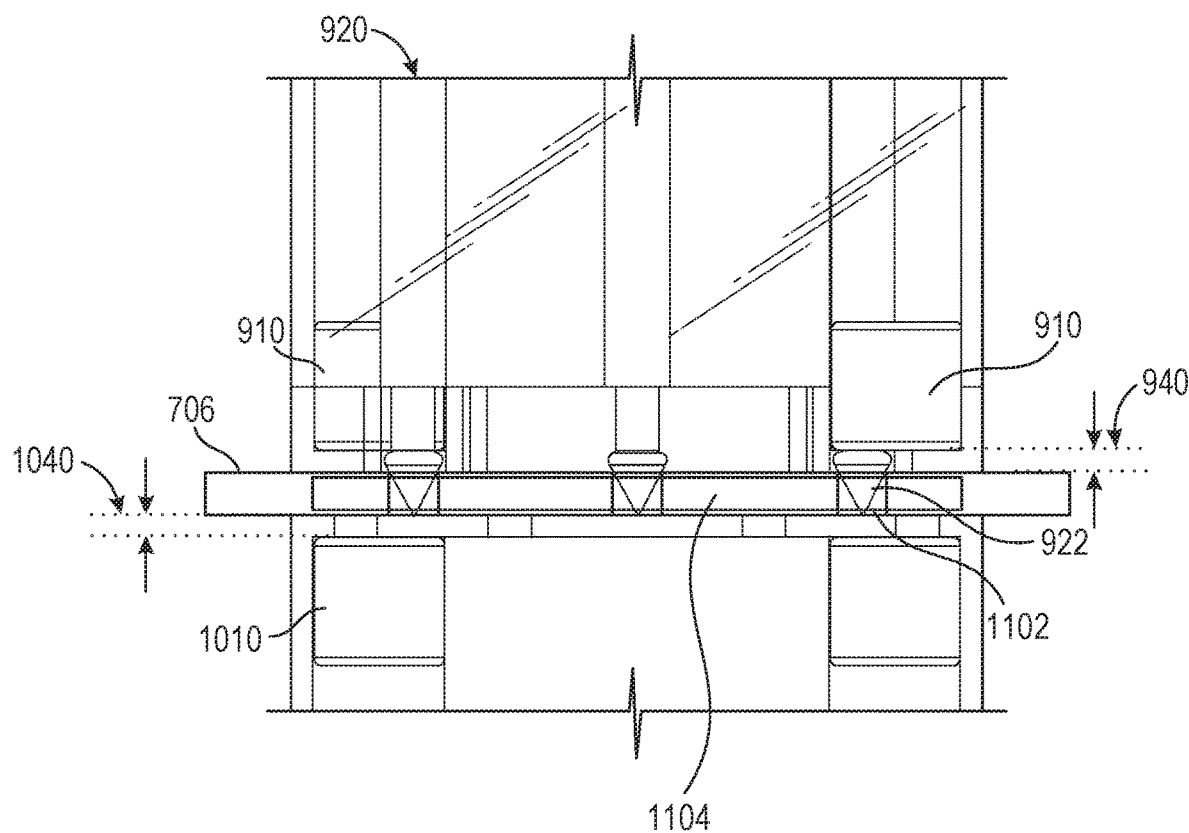

The contact-assembly magnets 910 are configured to mechanically couple with the contact holder 904 through the receptacles 908 and to be secured within the receptacles 908. To this end, the cross-section shape of the receptacles 908 are similar to the cross-section shape of the contact-assembly magnets 910. To secure the contact-assembly magnets 910 within the receptacles 908, the receptacle 908 includes a tapered portion having a dimension, e.g., diameter, slightly less than a corresponding dimension of the contact-assembly magnets 910. This difference in dimension provides a friction fit that secures the contact-assembly magnets 910 at the tapered portion within the receptacles 908 of contact holder 904, as shown in FIGS. 11A and 11B.

During mechanical coupling of the contact-assembly magnets 910 with the contact holder 904, a sufficient push force is applied to the contact-assembly magnets 910 to advance the contact-assembly magnets 910 along the length of the receptacle 908 until the surface of the contact-assembly magnets 910 encounters the closed second end 934. At this stage, the contact-assembly magnets 910 may be secured at its location in the receptacle 908 by a friction fit provided by a reduced-diameter, tapered portion of the receptacle 908. The contact-assembly magnets 910 are commonly oriented in the receptacles 908 so that the same pole, e.g., north or south, of each contact-assembly magnets 910 faces the second surface 936 of the contact holder 904.

In some embodiments, the void of the receptacle 908 that remains after a contact-assembly magnet 910 is inserted into the receptacle 908 is filled with a suitable material, e.g., epoxy. In some embodiments, the void is retained.

Figure 9A:
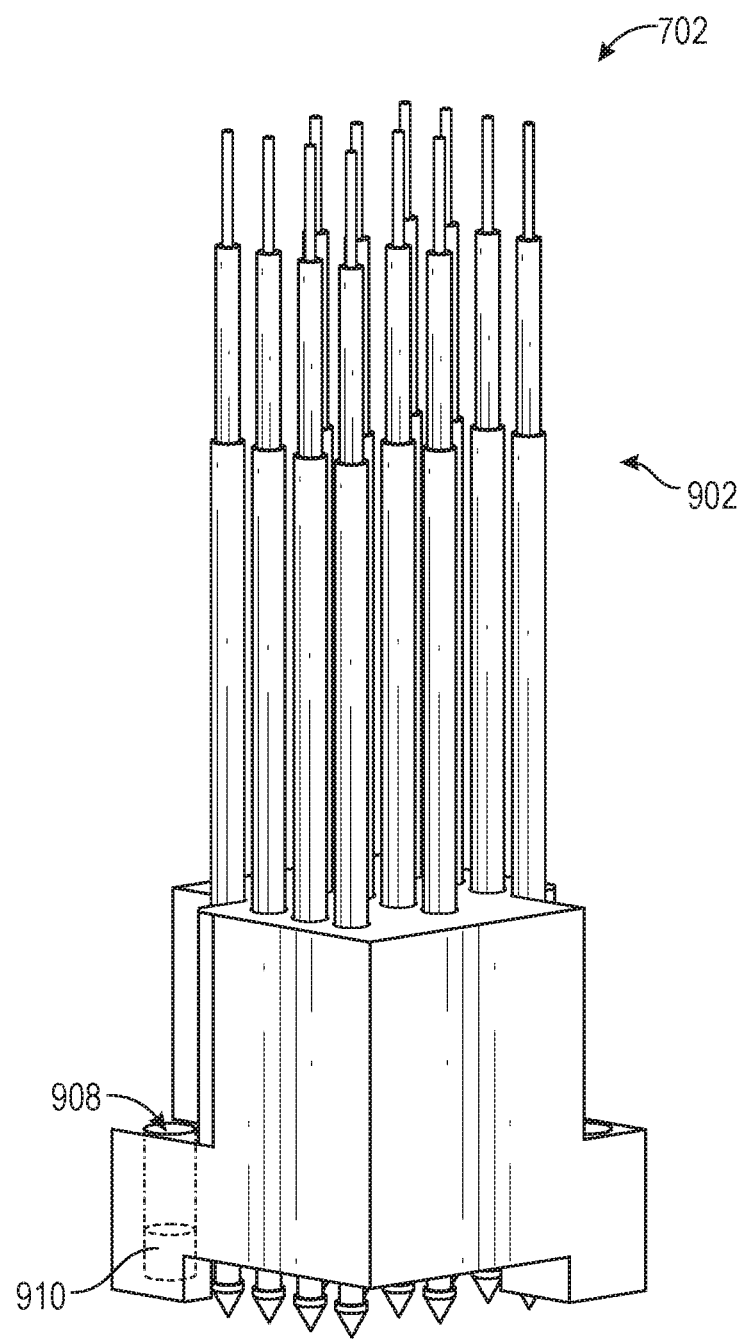
FIG. 9A is a perspective illustration of the contact assembly of the apparatus of FIG. 8 in accordance with one or more aspects of the disclosure.
Figure 9B:
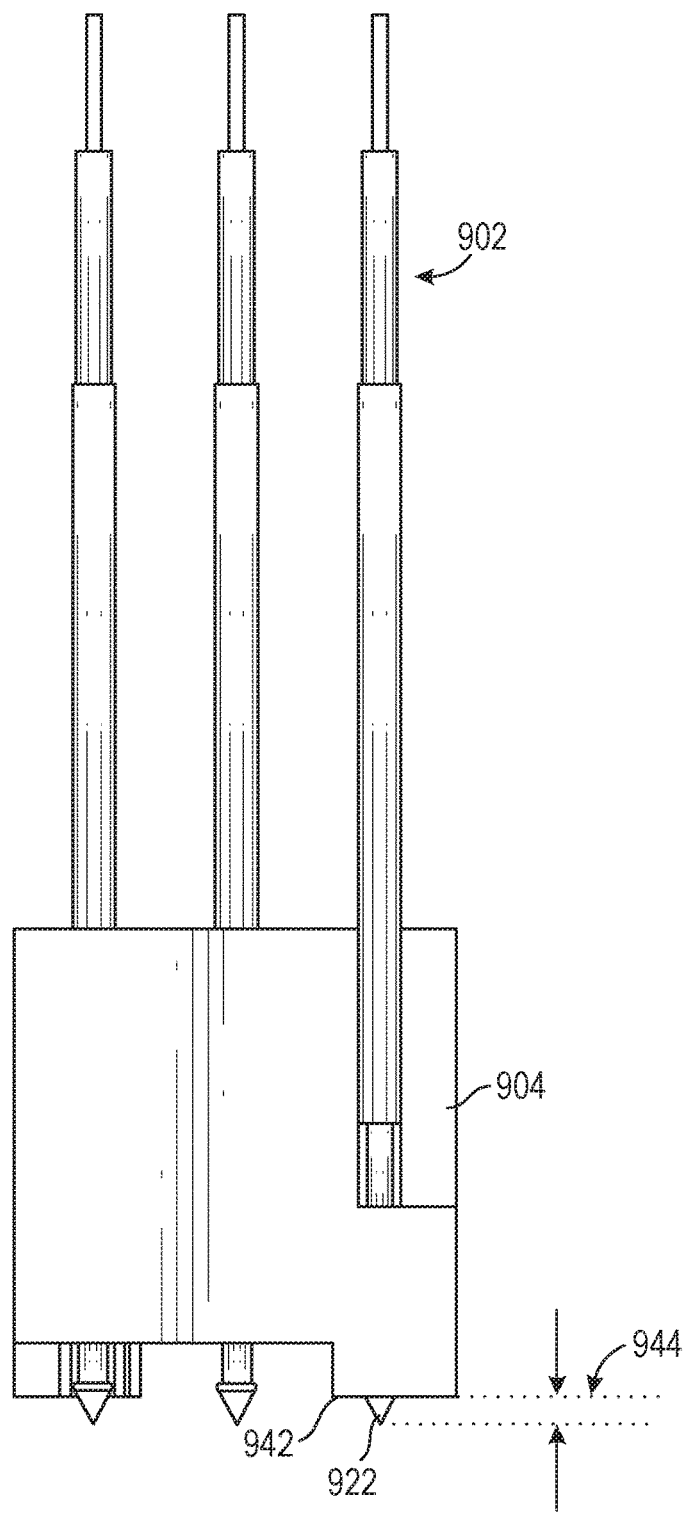
FIG. 9B is a sideview illustration of the contact assembly of the apparatus of FIG. 8 in accordance with one or more aspects of the disclosure.
Figure 9C:
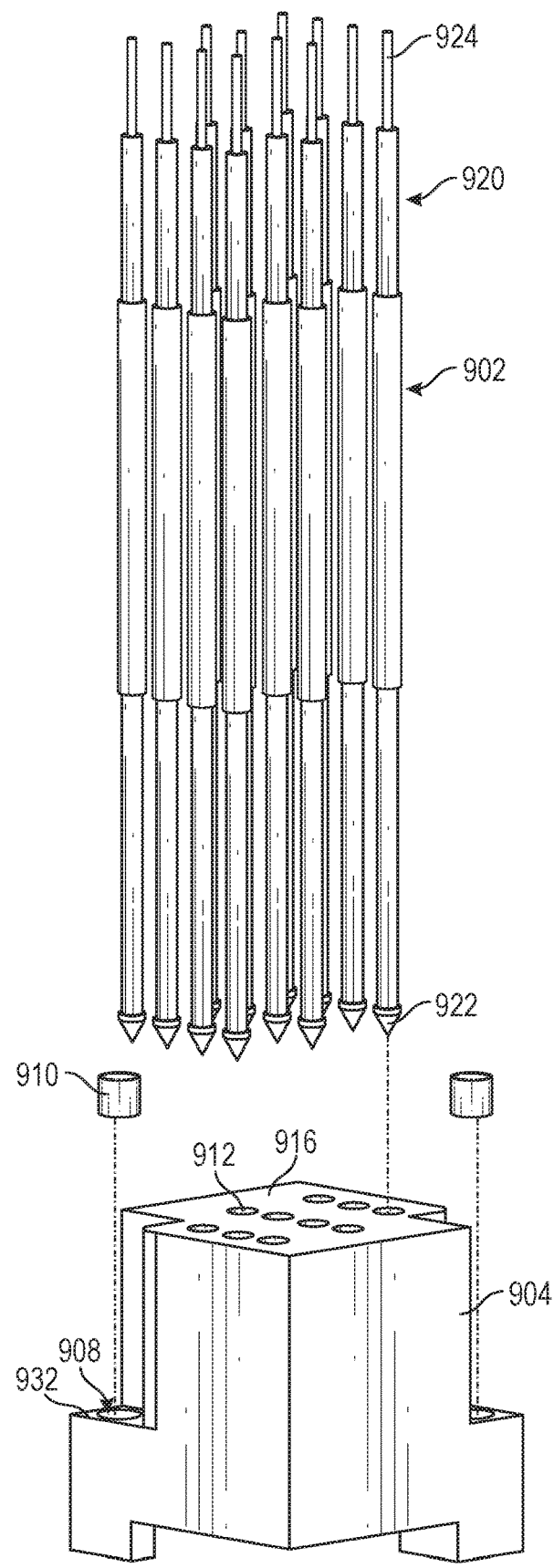
FIG. 9C is an exploded illustration of the contact assembly of the apparatus of FIG. 8 in accordance with one or more aspects of the disclosure.
Figure 9D:
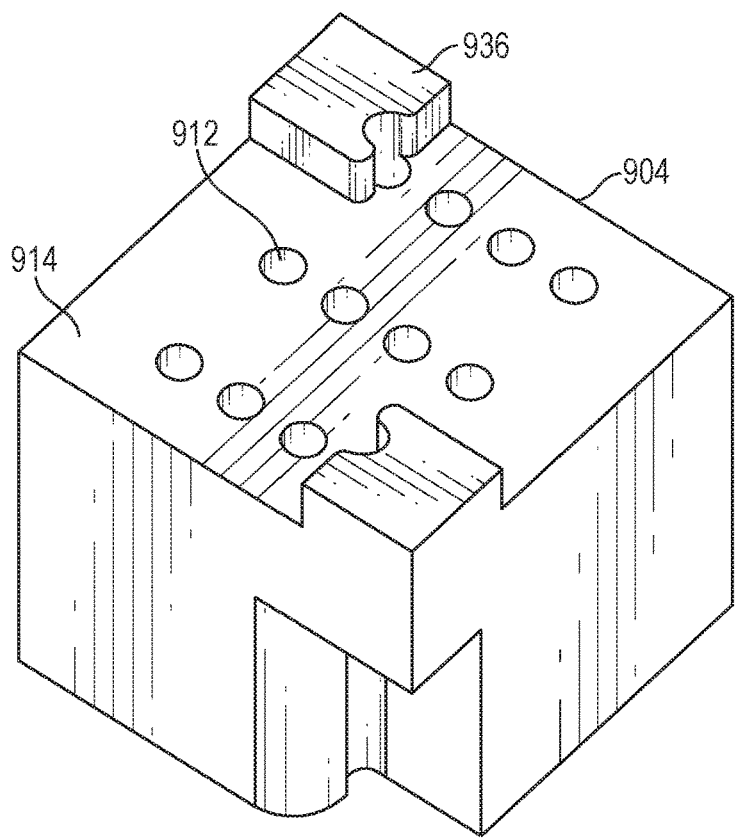
FIG. 9D is a bottom perspective illustration of a contact holder component of the contact assembly of the apparatus of FIG. 8 in accordance with one or more aspects of the disclosure.
Figure 9E:
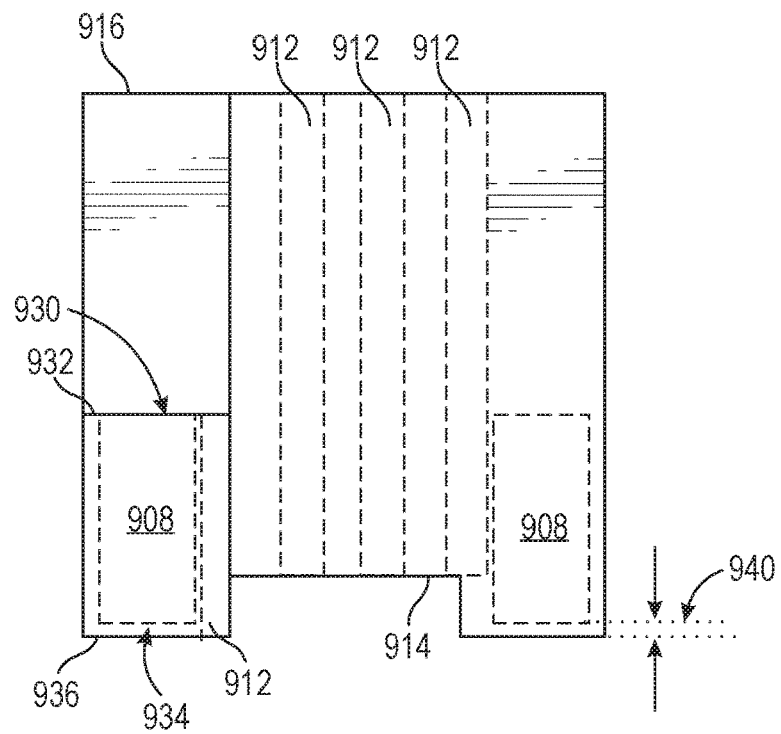
FIG. 9E is a sideview illustration of a contact holder component of the contact assembly of the apparatus of FIG. 8 in accordance with one or more aspects of the disclosure.
Figure 9F:
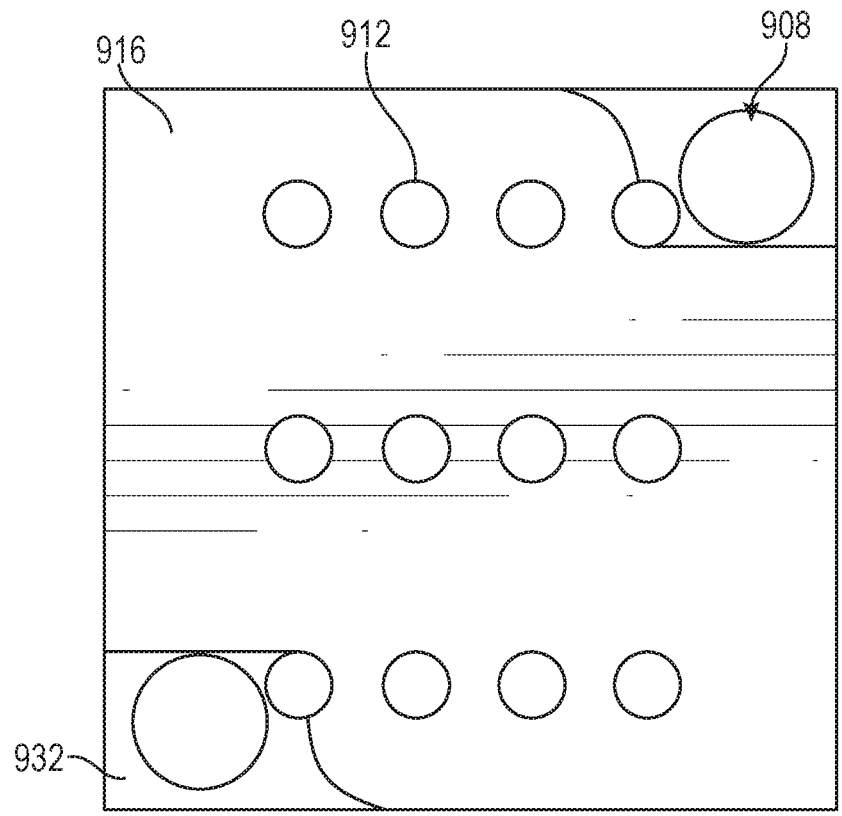
FIG. 9F is a plan view illustration of a contact holder component of the contact assembly of the apparatus of FIG. 8 in accordance with one or more aspects of the disclosure.

With reference to FIGS. 9A-9C, the electrical-contact subassembly 902 includes twelve electrical contact pins 920. Each electrical contact pin 920 has a first end 922 with an electrical contact and a second end 924. The electrical contact pins 920 are configured to normally bias the first end 922 in a direction away from the second end 924, and to move the first end 922 toward the second end 924 when the first end 922 encounters a force greater than the bias force. To this end, the electrical contact pin 920 may comprise a spring-loaded, pogo-pin structure at the first end 922 with a bias force. The contact holder 904 includes receptacles 912, each of which is configured to retain a respective one of the electrical contact pins 920. The receptacles 912 extend between opposite surfaces 914, 916 of the contact holder 904 and are open at both ends.

In the embodiment of FIGS. 9A-9C, the electrical-contact subassembly 902 includes twelve electrical contact pins 920 arranged in a 3×4 array. However, more or less than twelve electrical contact pins 920 may be included in an electrical-contact subassembly 902. The total bias force of the electrical-contact subassembly 902 is equal to the bias force of an electrical contact pin 920, multiplied by the number of electrical contact pins in the electrical-contact subassembly. For example, in some embodiments an electrical contact pin 920 has a spring-loaded, bias force of approximately 70.9 gram·force (gr·f)/2.5 ounce·force (oz·f). Thus, an electrical-contact subassembly 902 with twelve electrical contact pins, such as shown in FIGS. 9A-9C, has a bias force of approximately 851 gr·f/30 oz·f.

In some embodiments, the contact holder 904 and the electrical contact pins 920 of the electrical-contact subassembly 902 are integral. Integral in this context means the contact holder 904 and the electrical contact pins 920 are manufactured and/or assembled as a unitary structure and are not intended to be separable. In some embodiments, the electrical contact pins 920 of the electrical-contact subassembly 902 are separate components and the contact holder 904 is configured to receive and retain the electrical contact pins 920, and to allow for removal of the electrical contact pins 920. To this end, the contact holder 904 includes receptacles 912 configured to retain the electrical contact pins 920. In some embodiments, the contact holder 904 is formed of a hard plastic material, e.g., a polymer. In some embodiments, the contact holder 904 is manufactured using a three-dimensional (3D) printing machine and a printing program that creates the receptacles 912.

Each electrical contact pin 920 of the electrical-contact subassembly 902 is configured to mechanically couple with the contact holder 904 through a respective receptacle 912 and to be secured within the receptacle 912. To this end, the cross-section shape of the receptacle 912 is similar to the cross-section shape of the electrical-contact subassembly 902. To secure an electrical contact pin 920 within a receptacle 912 one or more dimensions of a portion of the receptacle 912 may be slightly less than corresponding dimensions of the electrical contact pin 920. This difference in one or more dimensions provides a friction fit that secures the electrical contact pin 920 within a receptacle 912 of the contact holder 904.

During mechanical coupling of an electrical contact pin 920 and the contact holder 904, a sufficient push force is applied to the electrical contact pin 920 to advance the electrical-contact subassembly 902 along the length or depth of a receptacle 912 until the electrical contact pin 920 encounters an interior surface (not visible) of the contact holder 904. At this location, the electrical contact pin 920 is secured within the receptacle 912 by a friction fit. With reference to FIG. 9B, at this location the first end 922 of the electrical contact pin 920 of the electrical-contact subassembly 902 extends beneath the lower surface 942 of the contact holder 904 by a distance 944. In some embodiments, the distance 944 is in the range of 0.2 to 0.8 mm, and in one example configuration is 0.5 mm. If necessary, an electrical contact pin 920 may be removed from its receptacle 912 upon application of sufficient pulling force. Removal of an electrical contact pin 920 may be desired, for example, to replace a damaged or failing electrical contact pin 920.

With reference to FIG. 11B, as disclosed above, the electrical contact pins 920 have a first end 922 with an electrical contact. The electrical contact is configured to electrically couple with an electrical interface 1102 of a circuit board 706. For example, as shown in FIG. 11B, in some embodiments the first end 922 has a conical electrical contact that is sized to mate with and thereby electrically couple with an electrical interface 1102 of a circuit board 706. The electrical interface 1102 of the circuit board 706 may be an electrically conductive via having a conical void sized to receive the first end 922 of the electrical contact pin 920. Or the electrical interface 1102 of the circuit board 706 may be a via having an electrically conductive inner wall that the first end 922 of the electrical contact pin 920 contacts. In either case, the first end 922 of the electrical contact pin 920 is configured to bias the first end 922 in the direction of the electrical interface 1102.

With reference to FIGS. 10A-10E, the base assembly 704 of the apparatus 700 includes a base holder 1002 and at least one base-assembly magnet 1010. In the embodiment of FIGS. 10A-10E, the base assembly 704 includes two base-assembly magnets 1010. However, more or less than two base-assembly magnets 1010 may be included in a base assembly 704. In one configuration, the base-assembly magnets 1010 have a diameter of 3 millimeters (mm) and are 3 mm thick. The base holder 1002 includes a grip 1004 for a person to hold while using the apparatus 700.

The base holder 1002 is configured to retain the base-assembly magnets 1010. To this end, the base holder 1002 includes a number of receptacles 1008 and each base-assembly magnet 1010 is retained within a respective receptacle 1008. The receptacles 1008 are located near opposite corners of the base holder 1002, to place the retained base-assembly magnets 1010 a distance from the electrical contact pins 920 of the electrical-contact subassembly 902 when the contact assembly 702 and the base assembly 704 are in the coupled state. This helps reduce the possibility of electromagnetic interference with electrical components of the electrical-contact subassembly 902. In some embodiments, the base holder 1002 is formed of a plastic material. In some embodiments, the base holder 1002 is manufactured using a three-dimensional (3D) printing machine and a printing program that creates the receptacles 1008.

With continued reference to FIGS. 10A-10E, in some embodiments, the receptacles 1008 extend between a first end 1030 at a first surface 1032 of the base holder 1002 and a second end 1034 at second surface 1036 of the base holder 1002. The receptacles 1008 are open at the first end 1030 to receive the magnet 1010, and closed at the second end 1034. The closed second end 1034 positions the base-assembly magnet 1010 within the base holder 1002 a distance 1040 from the second surface 1036. In other words, and with additional reference to FIG. 11B, the closed second end 1034 provides a physical barrier with a thickness 1040 between a surface of the base-assembly magnet 1010 and a surface of a circuit board 706. In some embodiments, the thickness 1040 is in the ranger of 0.2 to 0.8 mm, and in one example configuration is 0.5 mm.

The base-assembly magnets 1010 are configured to mechanically couple with the base holder 1002 through the receptacles 1008 and to be secured within the receptacles 1008. To this end, the cross-section shape of the receptacles 1008 are similar to the cross-section shape of the base-assembly magnets 1010. To secure the base-assembly magnets 1010 within the receptacles 1008, the receptacle 1008 includes a tapered portion having a dimension, e.g., diameter, slightly less than a corresponding dimension of the base-assembly magnets 1010. This difference in dimension provides a friction fit that secures the base-assembly magnets 1010 at the tapered portion within the receptacles 1008 of the base holder 1002, as shown in FIGS. 11A and 11B.

During mechanical coupling of the base-assembly magnets 1010 with the base holder 1002, a sufficient push force is applied to the base-assembly magnets 1010 to advance the base-assembly magnets 1010 along the length of the receptacle 1008 until the surface of the base-assembly magnets 1010 encounters the closed second end 1034. At this stage, the base-assembly magnets 1010 may be secured at its location in the receptacle 1008 by a friction fit provided by a reduced-diameter, tapered portion of the receptacle 1008. The base-assembly magnets 1010 are commonly oriented in the receptacles 1008 so that the same pole, e.g., north or south, of each base-assembly magnets 1010 faces the second surface 1036 of the base holder 1002. Furthermore, the orientation of the base-assembly magnets 1010 is opposite that of the contact-assembly magnets 910. For example, if the contact-assembly magnets 910 are oriented with their south pole facing the second surface 936 of the contact holder 904, then the base-assembly magnets 1010 are oriented with their north pole facing the second surface 1036 of the base holder 1002.

In some embodiments, the void of the receptacle 1008 that remains after a base-assembly magnet 1010 is inserted into the receptacle 1008 is filled with a suitable material, e.g., epoxy. In some embodiments, the void is retained.

Figure 10A:
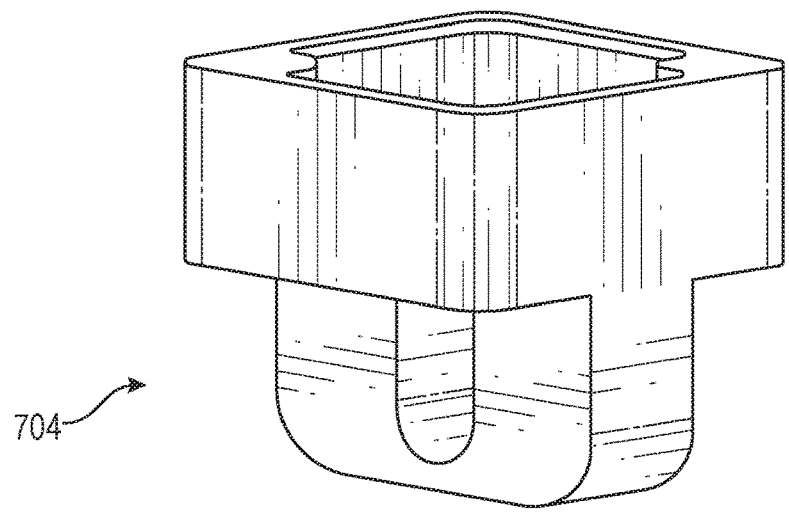
FIG. 10A is a bottom perspective illustration of the base assembly of the apparatus of FIG. 8 in accordance with one or more aspects of the disclosure.
Figure 10B:
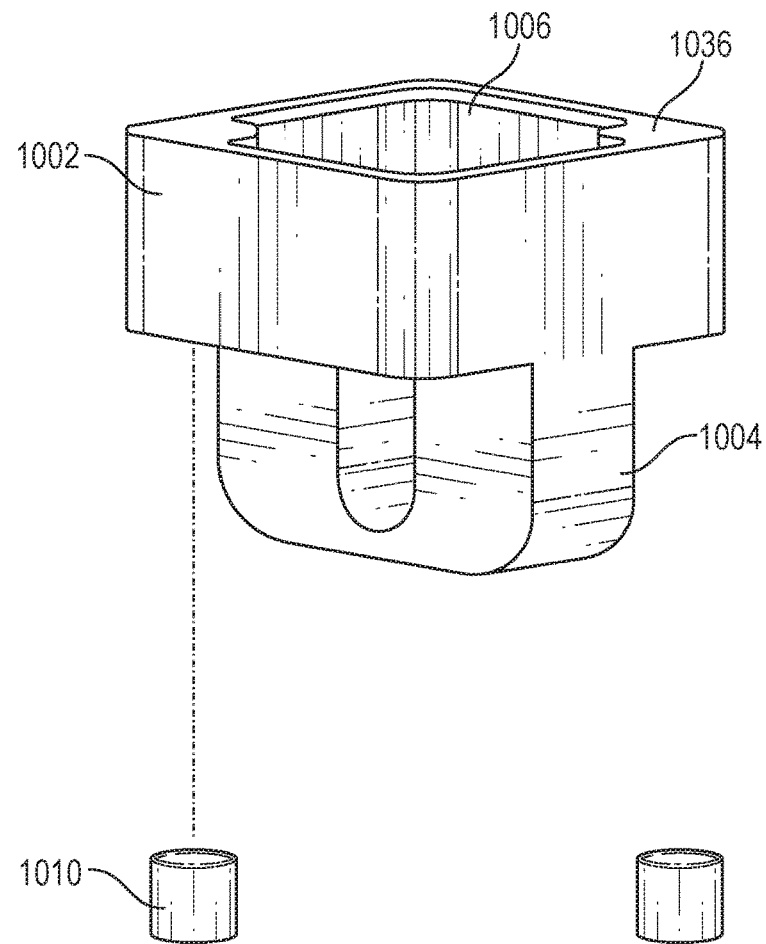
FIG. 10B is an exploded illustration of the base assembly of the apparatus of FIG. 8 in accordance with one or more aspects of the disclosure.

With reference to FIG. 10B, the base holder 1002 includes a receptacle 1006 with perimeter opening that is size receive the first ends 922 of the electrical contact pins 920. The receptacle 1006 functions to protect the first ends 922 of the electrical contact pins 920 when the apparatus 700 is not in use. For example, with reference to FIG. 8, when the apparatus is not in use the contact assembly 702 and the base assembly 704 can be magnetically coupled for storage. When coupled together as such, and without an intervening circuit board 706 as shown in FIG. 7, the first ends 922 of the electrical contact pins 920 extend into the receptacle 1006 and are thereby protected.

With reference to FIGS. 11A and 11B, in use of the apparatus 700, the base assembly 704 is positioned on one side (e.g., bottom side/surface) of a circuit board 706, underneath an electrical interface pad 1104, e.g., an UART communication pad, that is located on the opposite side (e.g., top side/surface) of the circuit board 706, while the contact assembly 702 is placed over the electrical interface pad 1104. Note that in FIGS. 11A and 11B, components on either side of the circuit board 706 are not shown for clarity of illustration. The contact-assembly magnets 910 associated with the contact assembly 702 and the base-assembly magnets 1010 associated with the base assembly 704 provide a magnet force that pulls and holds the contact assembly 702 and the base assembly 704 together, through the intervening circuit board 706. When held together as such, the electrical contacts 922 of the contact assembly 702 are biased toward and pressed into electrical contact with electrical interfaces (e.g., pin receptacles) 1102 of the electrical interface pad 1104.

The size of the contact-assembly magnets 910 and the base-assembly magnets 1010 are designed to provide a magnet coupling force through the thickness of the circuit board 706 and the respective thicknesses of the closed second end 934 of the contact holder 904 and the closed second end 1034, of the base holder 1002 sufficient to pull and hold the contact assembly 702 and the base assembly 704 together. The magnetic coupling force, however, is not so strong as to electromagnetically interfere with electrical signals passing through the electrical-contact subassembly 902. In some embodiments, the magnetic coupling force provided by the contact-assembly magnets 910 and the base-assembly magnets 1010 is greater than the biasing force of the electrical-contact subassembly 902. For example, as described above, in some embodiments the electrical-contact subassembly 902 has a bias force of approximately 851 gr·f/30 oz·f. Thus, in this configuration the magnetic coupling force provided by the contact-assembly magnets 910 and the base-assembly magnets 1010 is greater than 851 gr·f/30 oz·f. As previously mentioned, the contact-assembly magnets 910 and the base-assembly magnets are retained a distance from the electrical-contact subassembly 902. This distance reduces the amount of magnet force in the region of the electrical-contact subassembly 902.

With continued reference to FIG. 11B, features of the apparatus 700 protect the circuit board 706 from damage while the apparatus is magnetically coupled to the circuit board 706. For example, the contact assembly 702 maintains the contact-assembly magnets 910 a distance 940 away from the surface of the circuit board 706. Likewise, the base assembly 704 maintains the base-assembly magnets 1010 a distance 1040 away from the surface of the circuit board 706. As such, the surfaces of the magnets 910, 1010 do not contact the circuit board 706, and therefore cannot damage (or minimize any possible damage to) components or electrical traces on either side of the circuit board 706.

Figure 12:
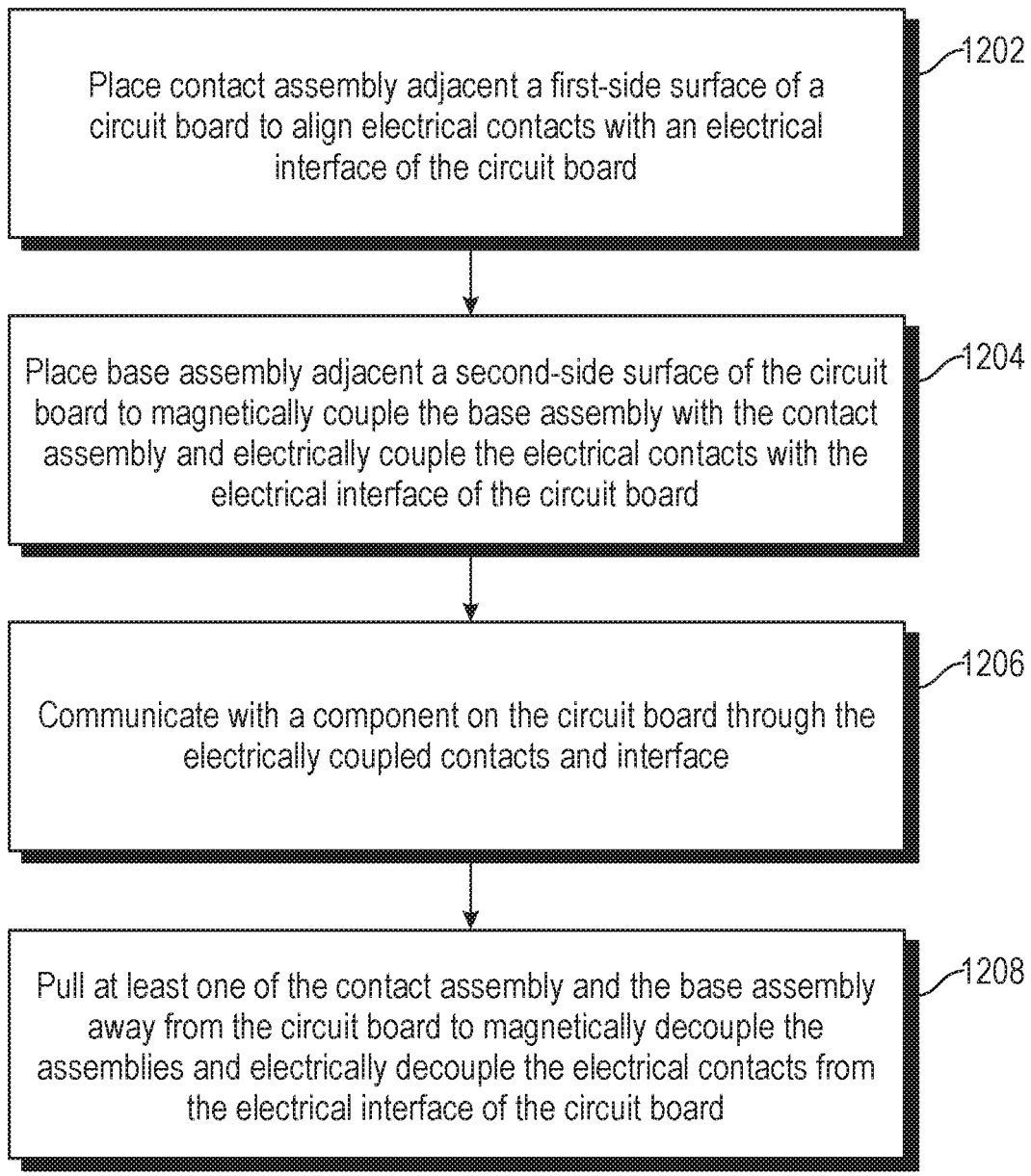
FIG. 12 is a flowchart of a method of electrically coupling with an electrical interface of a circuit board.

With reference to FIG. 12, a method of electrically coupling with an electrical interface of a circuit board is disclosed. The method may be performed using either of the apparatus 100 of FIG. 2 or the apparatus 700 of FIG. 8.

At block 1202, a contact assembly 102, 702 is placed adjacent a first-side surface of a circuit board 106 to align one or more electrical contacts 322 with one or more corresponding electrical interfaces 602 of the circuit board.

At block 1204, a base assembly 104, 704 is placed adjacent a second-side surface of the circuit board 106 to magnetically couple the base assembly 104, 704 with the contact assembly 102, 702 and electrically couple the one or more electrical contacts 322 with the corresponding one or more electrical interfaces 602 of the circuit board.

At block 1206, a component on the circuit board 106 is communicated with using the electrically coupled one or more electrical contacts 322 and corresponding one or more electrical interfaces 602 of the circuit board.

At block, 1208, at least one of the contact assembly 102 and the base assembly 104 is pulled away from the circuit board 106 to magnetically decouple the contact assembly 102 and the base assembly 104, and to electrically decouple the one or more electrical contacts 322 and the corresponding one or more electrical interfaces 602 of the circuit board.

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein.

Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising." "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol 'T' between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example. "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. An apparatus for coupling to an electrical interface of a circuit board, the apparatus comprising:
   a contact assembly comprising:
      at least one contact-assembly magnet, and
      a contact holder configured to retain the at least one contact-assembly magnet, and comprising an electrical-contact subassembly comprising at least one electrical contact pin including a first end, with an electrical contact configured to electrically couple with the electrical interface of the circuit board, and a second end; and
   a base assembly comprising:
      at least one base-assembly magnet, and
      a base holder configured to retain the at least one base-assembly magnet,
   wherein the contact assembly and the base assembly are configured to magnetically couple through the circuit board in a coupled state based on a magnetic coupling force caused by the at least one contact-assembly magnet and the at least one base-assembly magnet, and
   wherein, in the coupled state, the circuit board is positioned between the at least one contact-assembly magnet and the at least one base-assembly magnet.

2. The apparatus of claim 1, wherein:
   in the coupled state, the magnetic coupling force causes the contact assembly to be disposed against a first side of the circuit board and the base assembly to be disposed against a second side of the circuit board, opposite the first side; and
   the electrical interface is disposed on the first side of the circuit board.

3. The apparatus of claim 1, wherein the at least one contact-assembly magnet is retained within at least one receptacle of the contact holder.

4. The apparatus of claim 3, wherein the at least one receptacle of the contact holder extends between a first end at a first surface of the contact holder and a second end at a second surface of the contact holder.

5. The apparatus of claim 4, wherein the at least one receptacle is open at the first end to receive the at least one contact-assembly magnet and partially-closed at the second end by an annular rim to retain the at least one contact-assembly magnet within the contact holder at a preselected distance from the second surface.

6. The apparatus of claim 1, wherein the contact assembly comprises a plurality of contact-assembly magnets, each contact-assembly magnet respectively retained in a respective receptacle of a plurality of receptacles of the contact holder.

7. The apparatus of claim 1, wherein the at least one base-assembly magnet is retained within at least one receptacle of the base holder.

8. The apparatus of claim 7, wherein the at least one receptacle of the base holder extends between a first end at a first surface of the base holder and a second end at a second surface of the base holder.

9. The apparatus of claim 8, wherein the at least one receptacle of the base holder is open at the first end to receive the at least one base-assembly magnet and partially-closed at the second end by an annular rim to retain the at least one base-assembly magnet within the base holder at a preselected distance from the second surface.

10. The apparatus of claim 7, wherein the base assembly comprises a plurality of base-assembly magnets, each base-assembly magnet respectively retained in a respective receptacle of a plurality of receptacles of the base holder.

11. The apparatus of claim 1, wherein the contact holder further comprises a slot configured to receive and retain the electrical-contact subassembly.

12. The apparatus of claim 11, wherein the electrical-contact subassembly comprises:
   a plurality of electrical contact pins, each electrical contact pin having a first end, with an electrical contact configured to electrically couple with the electrical interface of the circuit board, and a second end; and a housing configured to retain the plurality of electrical contact pins and to fit within the slot of the contact holder.

13. The apparatus of claim 12, wherein the electrical-contact subassembly is configured:
to slide within the slot upon application of sufficient pushing force;
to be secured within the slot by a friction fit; and
to be removed from the slot upon application of sufficient pulling force.

14. The apparatus of claim 12, wherein the housing encloses a central portion of each electrical contact pin of the plurality of electrical contact pins, while leaving the first end with the electrical contact and leaving the second end exposed.

15. The apparatus of claim 12, wherein the housing comprises:
a first face having a plurality of pin channels, each pin channel configured to receive a portion of one electrical contact pin of the plurality of electrical contact pins; and
a second face having a plurality of pin channels, each pin channel configured to receive a portion of one electrical contact pin of the plurality of electrical contact pins.

16. The apparatus of claim 1, wherein the electrical-contact subassembly comprises at least one electrical contact pin that is received and retained within a channel of the contact holder.

17. The apparatus of claim 16, wherein the electrical-contact subassembly comprises a plurality of contact pins, each contact pin retained in a respective channel of a plurality of channels of the contact holder.

18. The apparatus of claim 17, wherein the plurality of contact pins is arranged as an array of electrical contacts corresponding to an array of electrical contacts of the electrical interface of the circuit board.

19. The apparatus of claim 1, wherein the second end of the electrical-contact subassembly is configured to electrically couple with an electrical connector.

20. A test assembly comprising:
the apparatus of claim 1, wherein the circuit board comprises an integrated circuit component; and
a test computer configured to be coupled to the second end of the at least one electrical contact pin, wherein the test computer is configured to communicate with the integrated circuit component using the at least one electrical contact pin and the electrical interface of the circuit board.

21. The apparatus of claim 1, wherein:
the base assembly comprises a surface area configured to contact the circuit board; and
the surface area of the base assembly is smaller than a surface area of the circuit board.

22. A method of electrically coupling with an electrical interface of a circuit board, the method comprising:
placing a contact assembly adjacent a first-side surface of a circuit board to align one or more electrical contacts with one or more corresponding electrical interfaces of the circuit board; and
placing a base assembly adjacent a second-side surface of the circuit board to magnetically couple the base assembly with the contact assembly through the circuit board in a coupled state and to electrically couple the one or more electrical contacts with the one or more corresponding electrical interfaces of the circuit board,
wherein, in the coupled state, the circuit board is positioned between at least one contact-assembly magnet of the contact assembly and at least one base-assembly magnet of the base assembly.

23. The method of claim 22, further comprising:
communicating with an integrated circuit component on the circuit board using the electrically coupled one or more electrical contacts and the one or more corresponding electrical interfaces of the circuit board.

24. The method of claim 22, further comprising:
pulling at least one of the contact assembly and the base assembly away from the circuit board to magnetically decouple the contact assembly and the base assembly, and to electrically decouple the one or more electrical contacts and the one or more corresponding electrical interfaces of the circuit board.

25. An apparatus comprising:
means for placing a contact assembly adjacent a first-side surface of a circuit board to align one or more electrical contacts with one or more corresponding electrical interfaces of the circuit board; and
means for placing a base assembly adjacent a second-side surface of the circuit board to magnetically couple the base assembly with the contact assembly through the circuit board in a coupled state and to electrically couple the one or more electrical contacts with the one or more corresponding electrical interfaces of the circuit board,
wherein, in the coupled state, the circuit board is positioned between at least one contact-assembly magnet of the contact assembly and at least one base-assembly magnet of the base assembly.

* * * * *